Feb. 27, 1923.

E. J. VON PEIN 1,446,675

CHANGE MAKING TICKET REGISTER

Filed Jan. 11, 1917

Inventor
EDWARD J. VON PEIN
by R. C. Glass.
Attorney

Feb. 27, 1923.
E. J. VON PEIN
CHANGE MAKING TICKET REGISTER
Filed Jan. 11, 1917   13 sheets-sheet 3

Inventor
EDWARD J. VON PEIN
Attorney

Feb. 27, 1923.

E. J. VON PEIN

CHANGE MAKING TICKET REGISTER

Filed Jan. 11, 1917

Inventor
EDWARD J. VON PEIN
by R. C. Glass.
Attorney

Feb. 27, 1923. 1,446,675
E. J. VON PEIN
CHANGE MAKING TICKET REGISTER
Filed Jan. 11, 1917 13 sheets-sheet 5
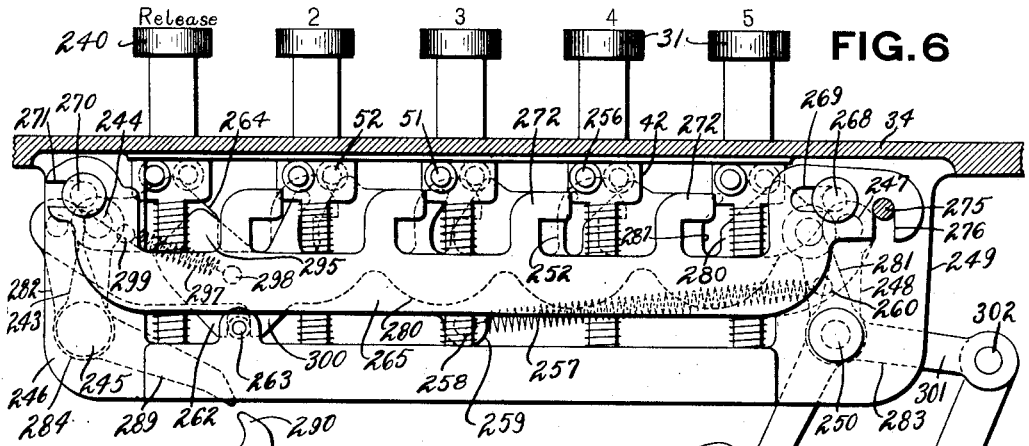
FIG. 6
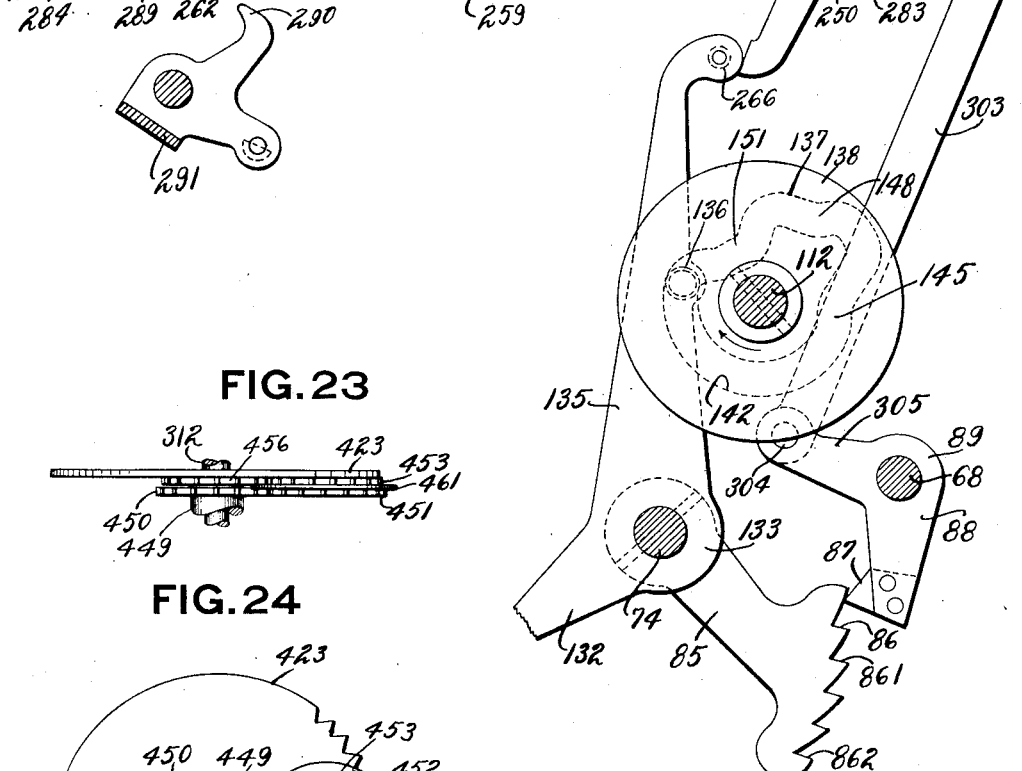
FIG. 23
FIG. 24
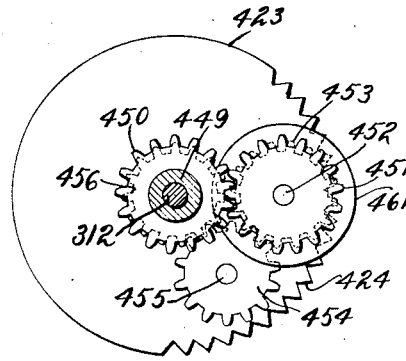
Inventor
EDWARD J. VON PEIN
by R. Chloss
Attorney

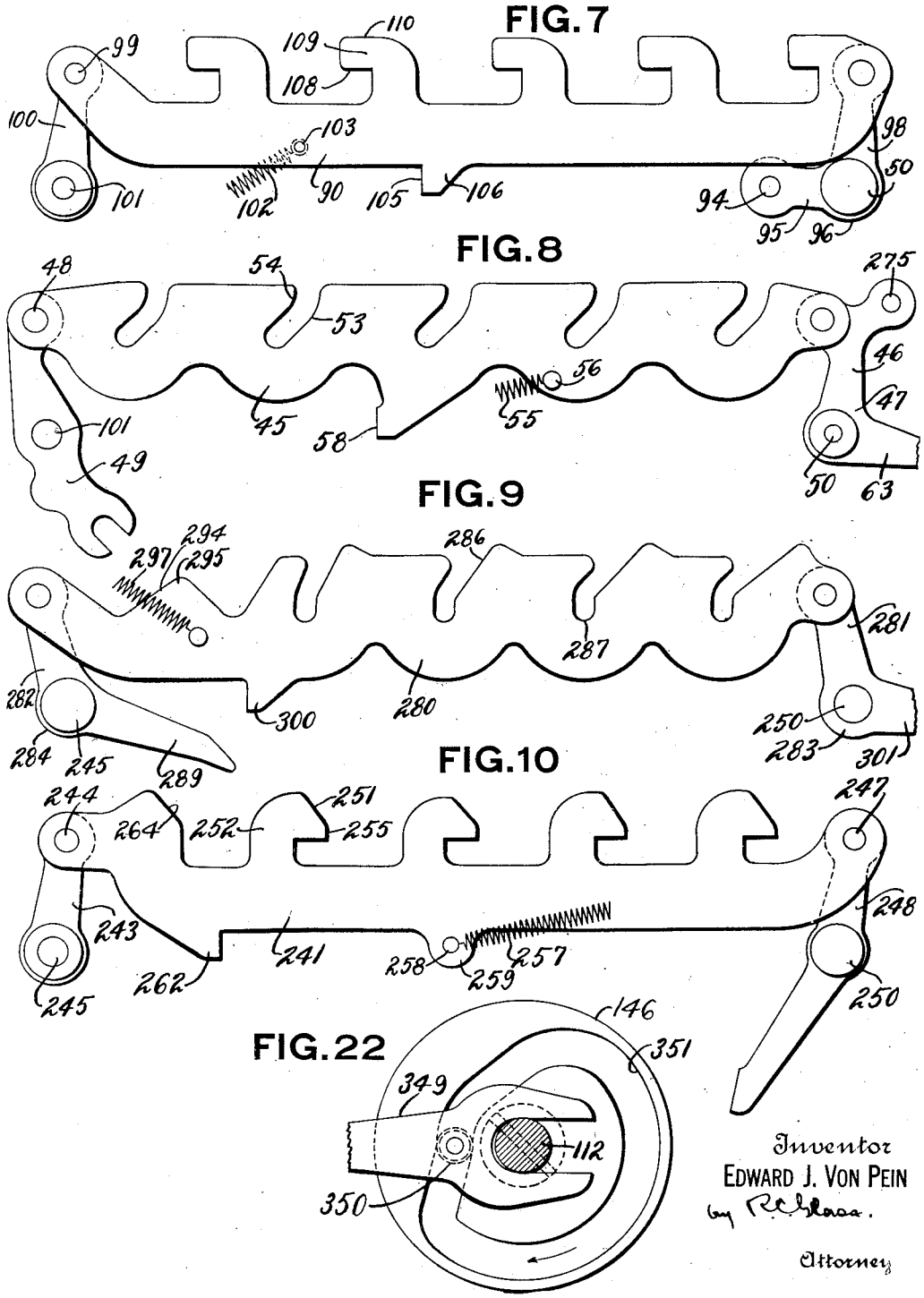

Feb. 27, 1923. 1,446,675
E. J. VON PEIN
CHANGE MAKING TICKET REGISTER
Filed Jan. 11, 1917 13 sheets-sheet 7

Inventor
EDWARD J. VON PEIN
Attorney

Feb. 27, 1923.

E. J. VON PEIN

CHANGE MAKING TICKET REGISTER

Filed Jan. 11, 1917   13 sheets-sheet 8

1,446,675

Inventor
EDWARD J. VON PEIN
by R. C. Glass
Attorney

Feb. 27, 1923.
E. J. VON PEIN
1,446,675
CHANGE MAKING TICKET REGISTER
Filed Jan. 11, 1917    13 sheets-sheet 9
FIG. 13
FIG. 20
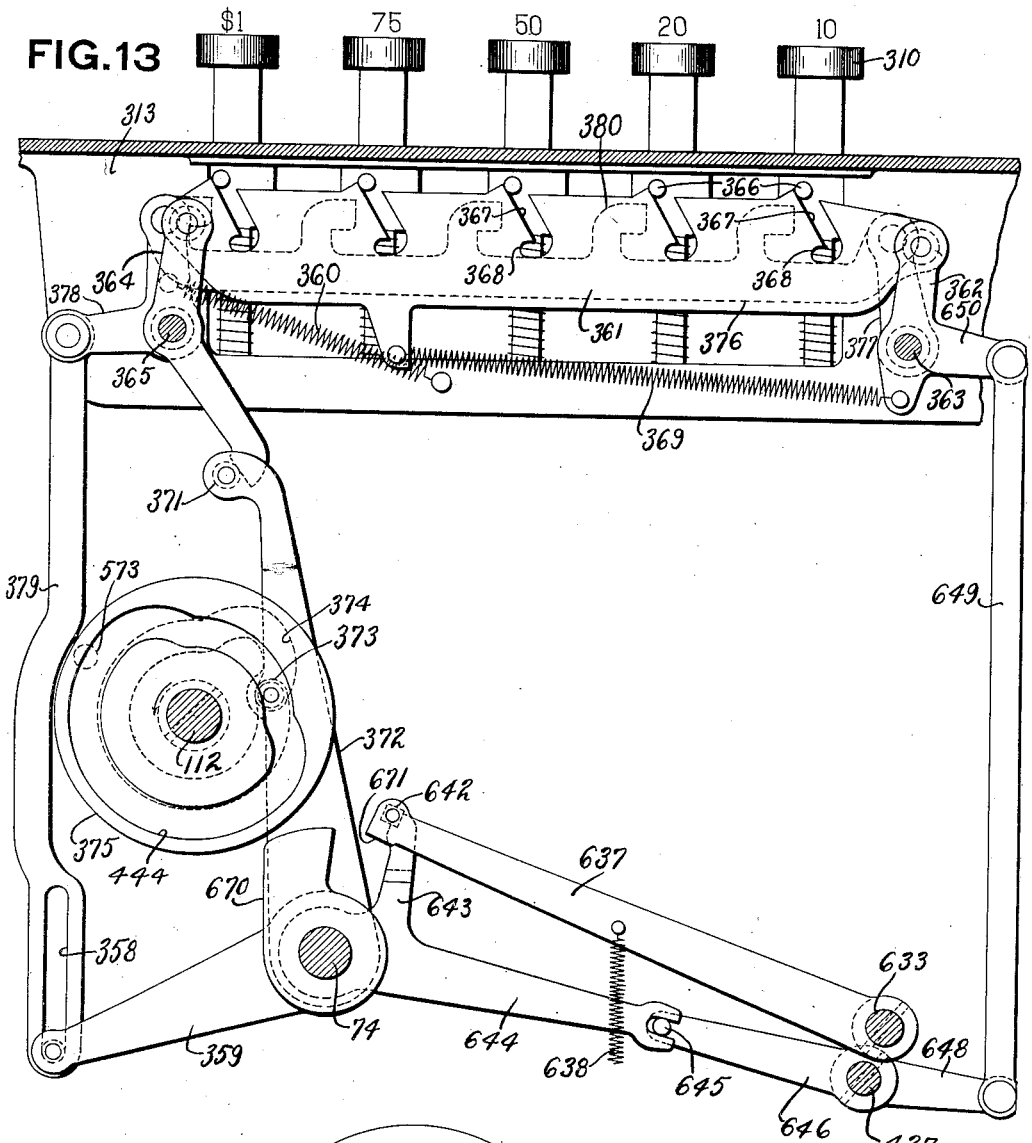
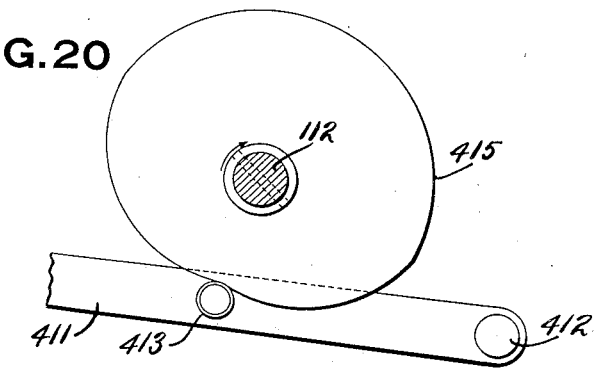
Inventor
EDWARD J. VON PEIN
by R. C. Glass
Attorney Feb. 27, 1923.

E. J. VON PEIN 1,446,675

CHANGE MAKING TICKET REGISTER

Filed Jan. 11, 1917

Inventor
EDWARD J. VON PEIN
by R. Chler
Attorney

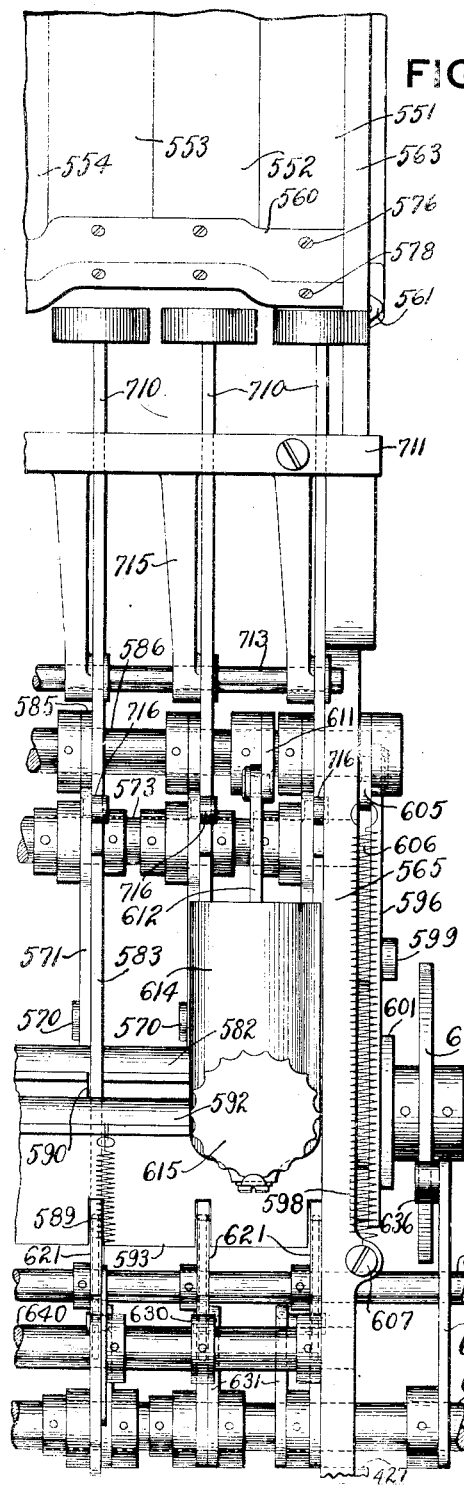
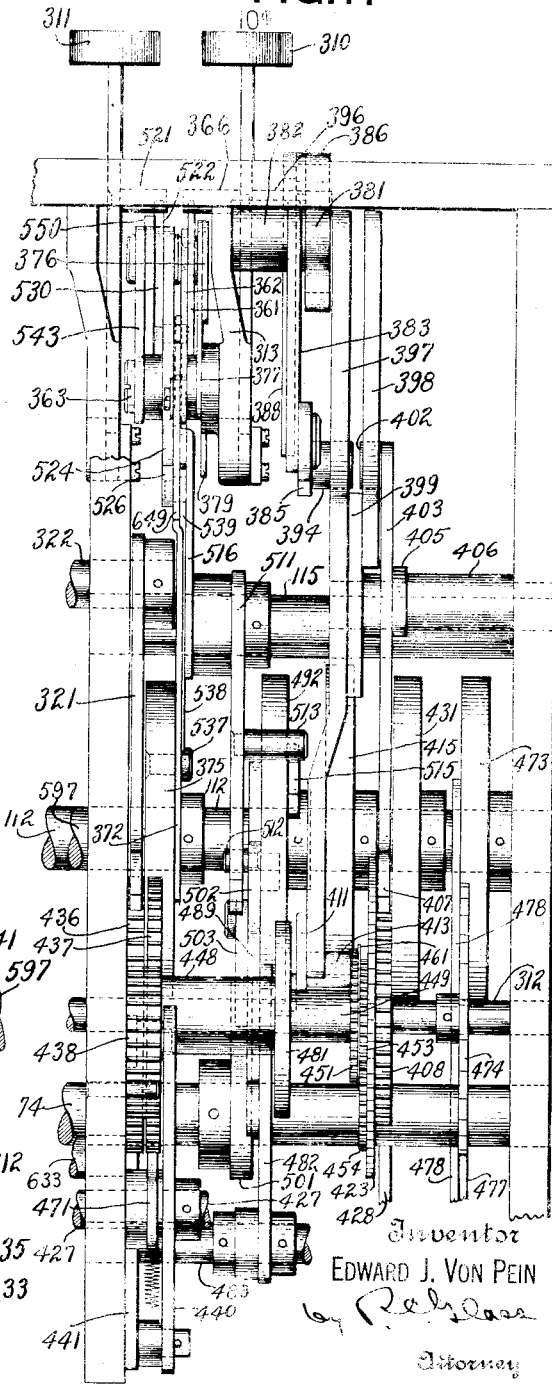

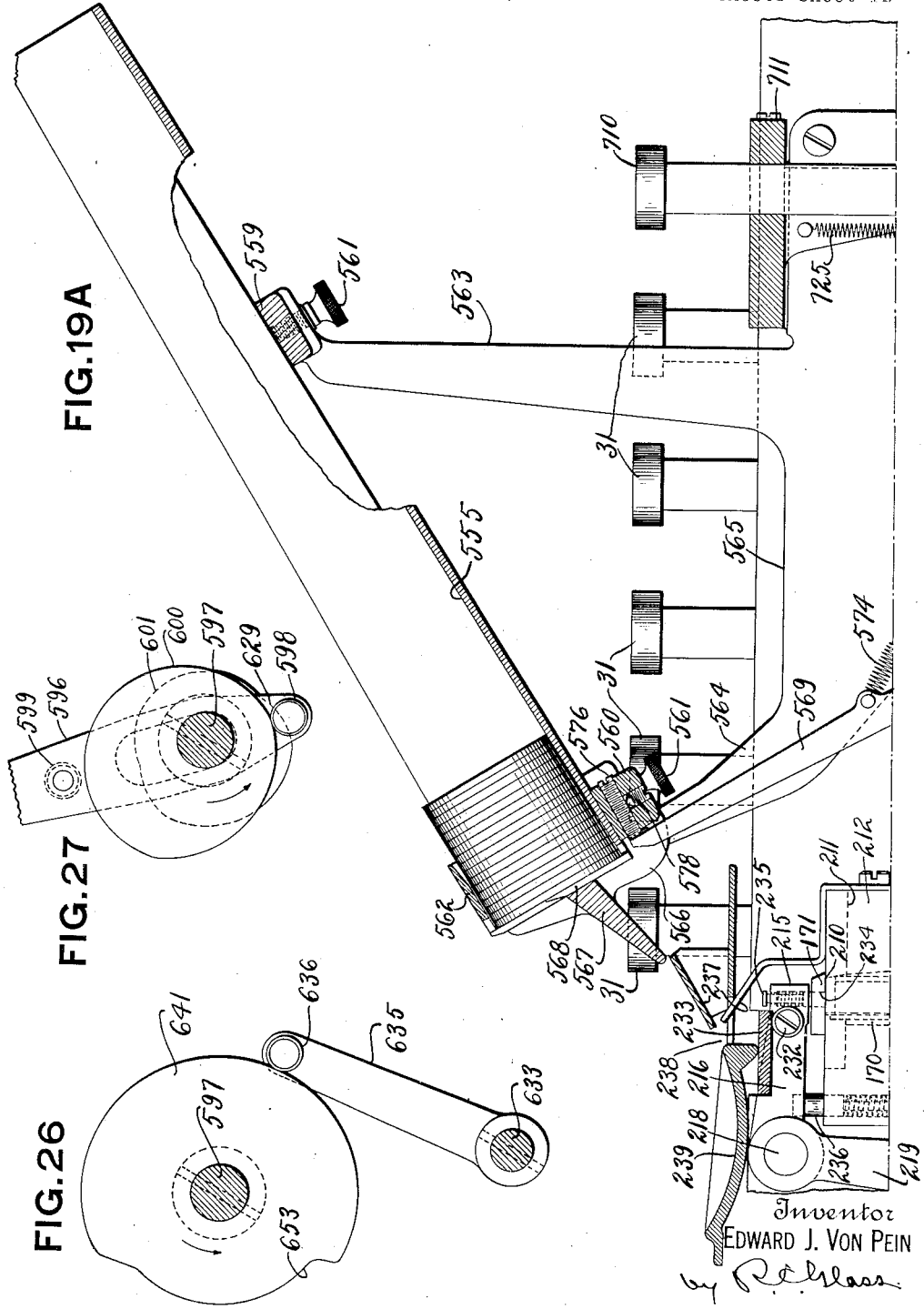

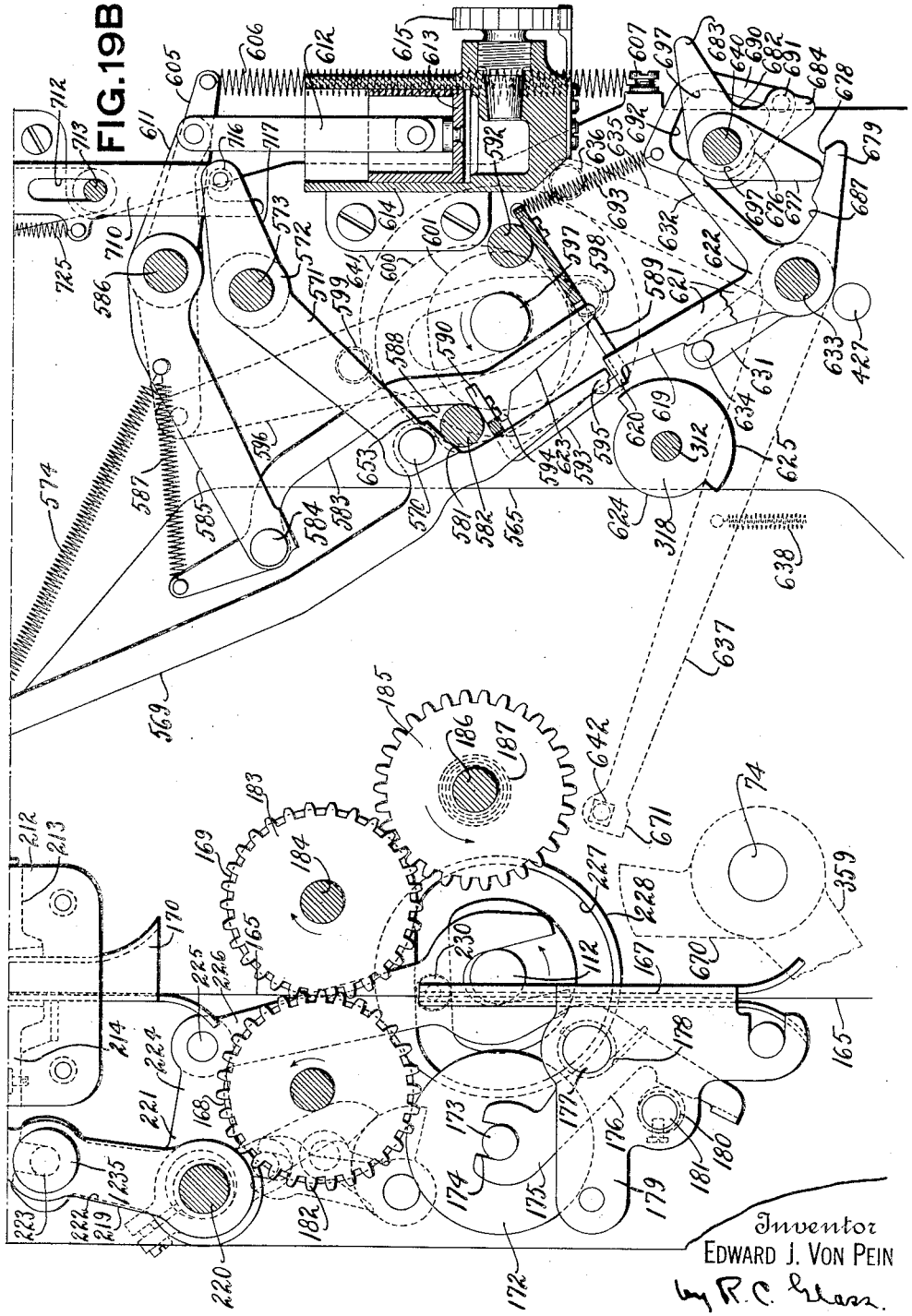

Patented Feb. 27, 1923.

1,446,675

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO.

CHANGE-MAKING TICKET REGISTER.

Application filed January 11, 1917. Serial No. 141,762.

*To all whom it may concern:*

Be it known that I, EDWARD J. VON PEIN, a citizen of the United States, residing at Dayton, in the county of Montgomery and State of Ohio, have invented certain new and useful Improvements in Change-Making Ticket Registers, of which I declare the following to be a full, clear, and exact description.

This invention relates to money changers and has more particular relation to that class of machines which are adapted to compute and issue the correct change.

This invention has been shown in connection with a ticket issuing mechanism such as is shown in Letters Patent of the United States to Francesco Skerl No. 1,302,600 granted May 6, 1919, though it is to be understood that it may be used in connection with other mechanisms.

One of the chief problems confronting managers of motion picture houses and the like and, in fact, any place where tickets are sold and used is to gain speed in the admission of patrons to such places. There have been various machines invented to accomplish this end. Machines for issuing the desired number of tickets have been used for some time and have greatly increased the speed with which crowds can be handled. There is, however, still one draw-back to the system and that is the necessity of mentally computing the amount of change due a customer and issuing it by hand. It is obvious that it would be very desirable to combine in one machine the ticket issuing mechanism and means for computing and issuing correct change. It is, therefore, the main object of this invention to provide a mechanism which will compute and issue the amount of change due a purchaser of the tickets issued by the machine.

It is also an object of this invention to provide means for ejecting coins upon the manual operation of certain of the keys.

Another object of the invention is to provide means whereby when a plurality of tickets of different denominations are desired the change will be computed upon successive operations but not issued until the last operation.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:

Fig. 6 is a transverse vertical section taken on the line 6—6 (Fig. 1) with some of the mechanism removed and shows the device for controlling the number of tickets to be issued by the machine.

Figs. 7 and 8 respectively are detail views of a detent and plate employed to lock the price keys in depressed position and to disable the device normally locking the machine against operation.

Figs. 9 and 10 respectively are detail views of a plate and a detent employed to determine the number of tickets to be issued at each operation of the machine and temporarily to retain the depressed number key in depressed position until the beginning of the operation of the operating mechanism.

Figure 11:
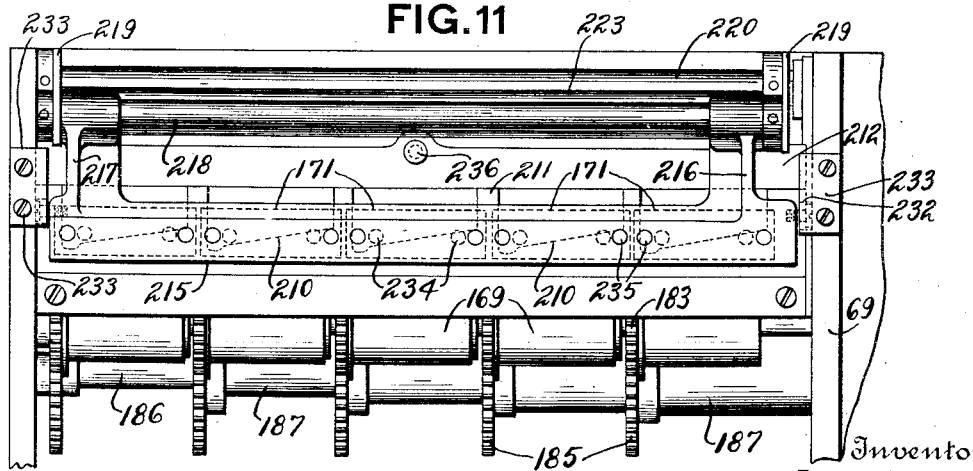

Fig. 11 is a top plan view of the ticket issuing and severing mechanism showing parts broken away.

Figures 12, 21:
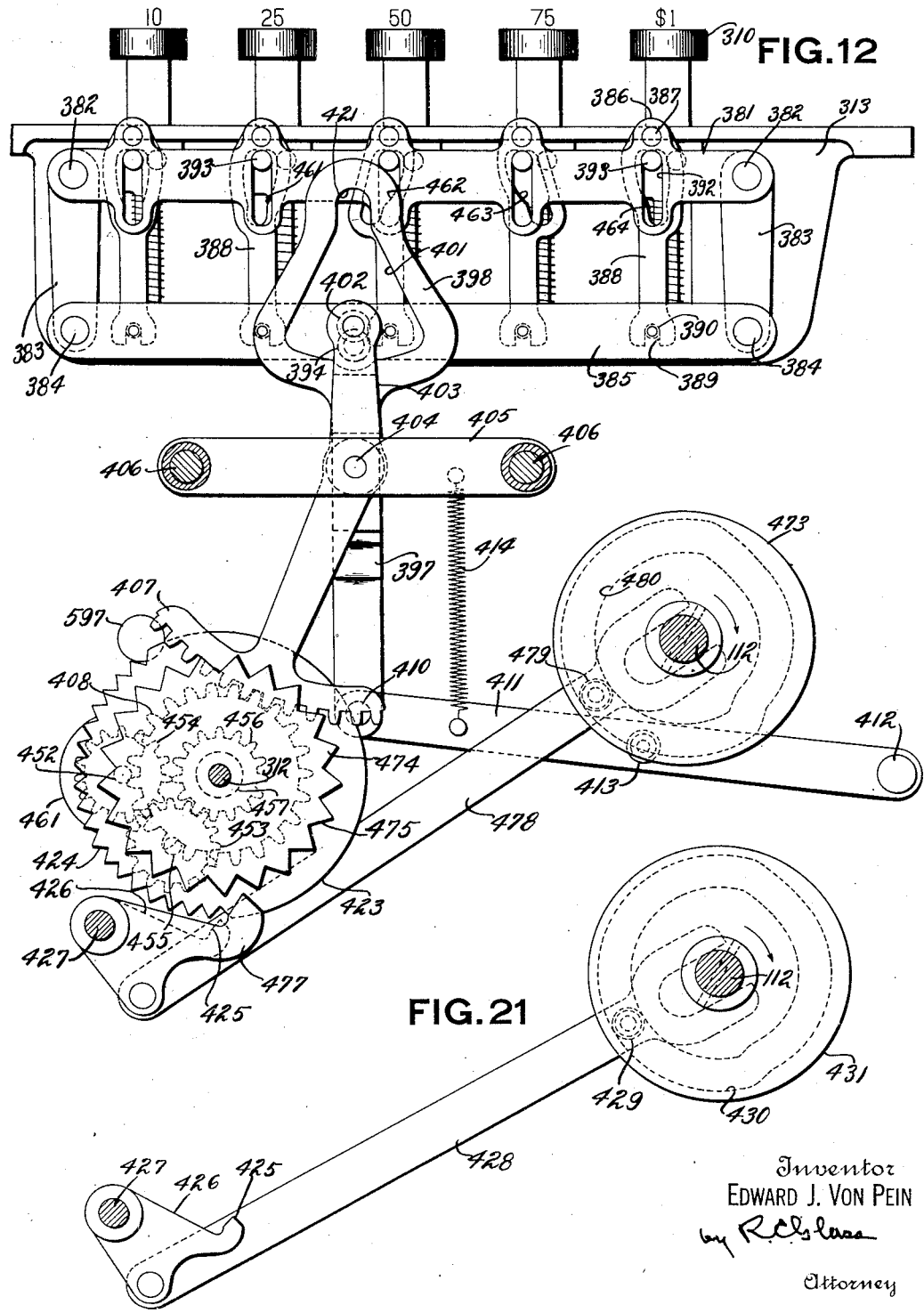

Fig. 12 is a transverse sectional view taken just to the right of the bank of amount tendered keys and shows the mechanism controlled by these keys for setting up in the planetary gearing the amounts tendered.

Fig. 13 is a transverse sectional view taken just to the left of the bank of amount tendered keys and shows the mechanism for releasing the coin ejectors for operation and also the mechanism for releasing the depressed amount tendered key.

Figure 14:
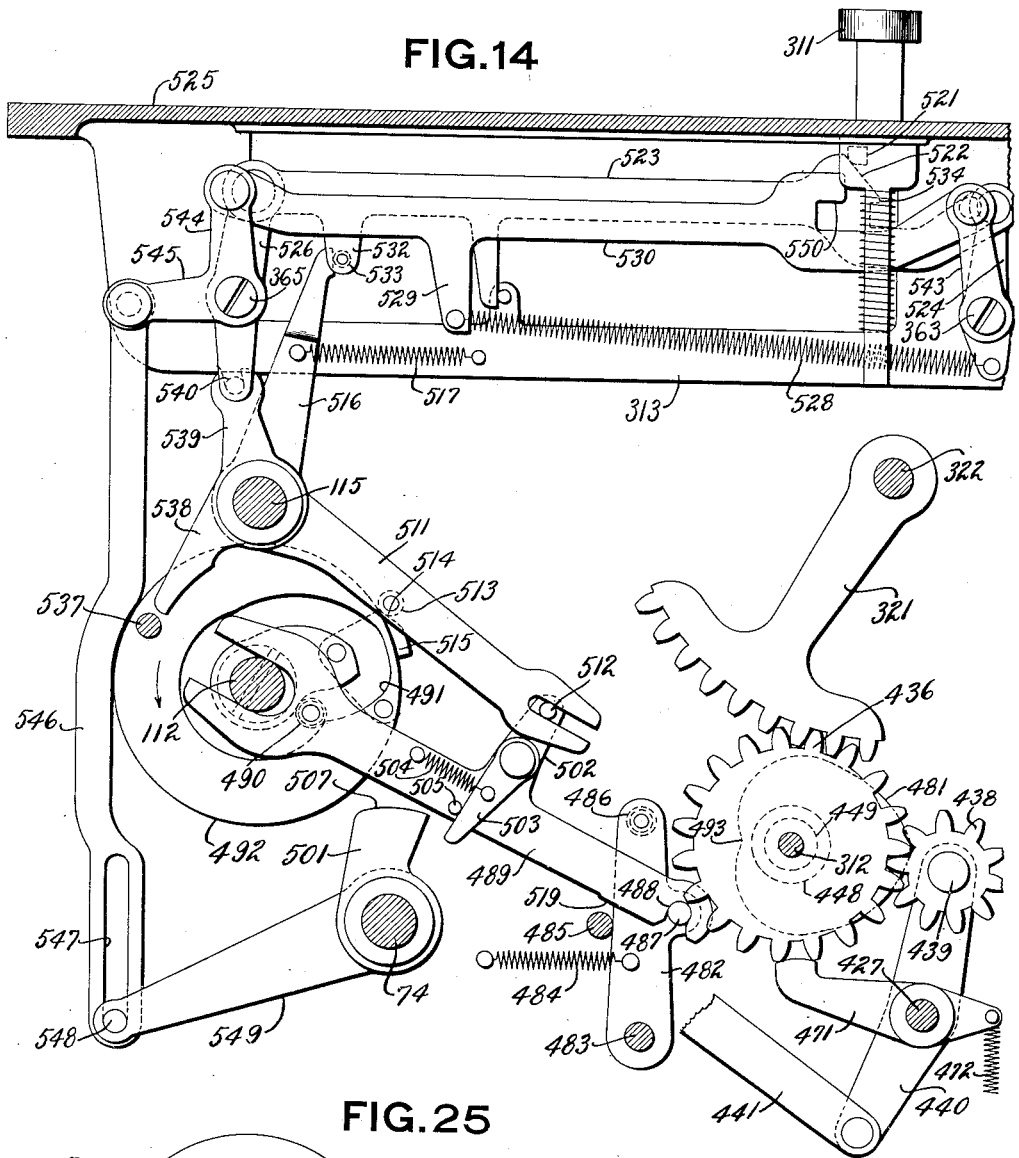

Fig. 14 is a transverse sectional view taken just to the left of the two price ticket key and shows the mechanism controlled by this key as well as the means for setting up in the planetary gearing the value of the tickets sold.

Figure 15:
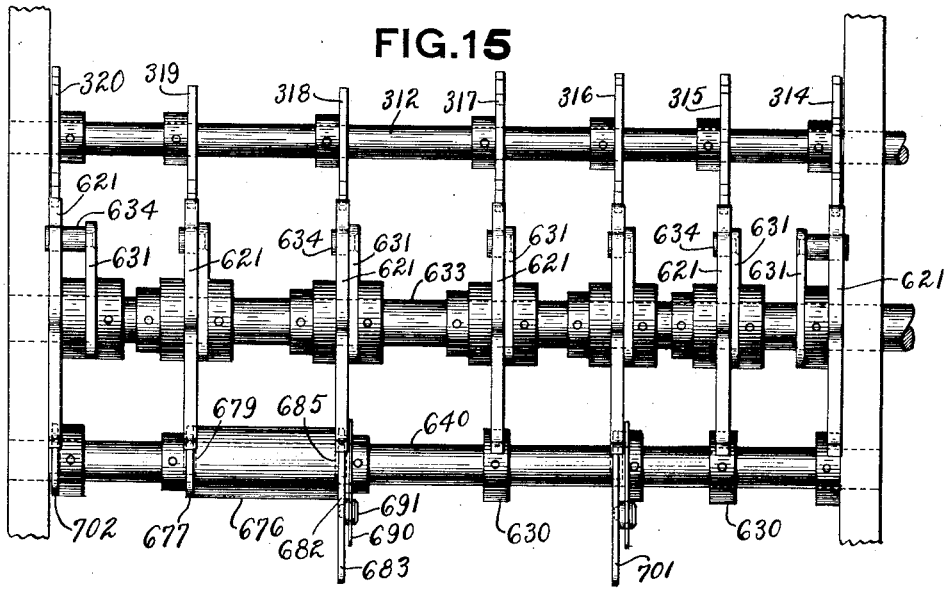

Fig. 15 (Sheet 7) is a top plan view with top of cabinet removed of the ejector actuating arms and the ejector disks whereby the operation of these arms is controlled.

Figure 16:
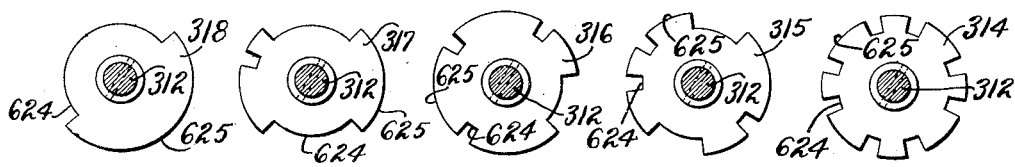

Fig. 16 (Sheet 7) is a group of details showing the contour and relative positions of the disks controlling operation of the change ejectors.

Fig. 17 (Sheet 11) is a partial front elevation with parts broken away showing the two price ticket key and the bank of amount tendered keys as well as the planetary gearing.

Fig. 18 is a partial front elevation showing the keys for issuing change independently of the operation of the machine.

Figs. 19$^A$ and 19$^B$ taken together constitute a full size transverse sectional view taken just to the left of the 50¢ coin tube although Fig. 19$^B$ includes the coin ejector controlling mechanism whereby two twenty-five cent pieces may be ejected instead of a 50¢ piece.

Fig. 20 (Sheet 9) is a detail view showing the cam and part of the arm for operating the segment which sets up in the planetary gearing the amount tendered.

Fig. 21 (Sheet 8) is a detail view of the cam and pitman and aligning pawl for aligning and locking the disk in the planetary gearing upon which the amount tendered is set up.

Fig. 22 (Sheet 6) is a detail view of the cam and part of the pitman which actuates the differential mechanism for the totalizers.

Fig. 23 (Sheet 5) is a detail top plan view of the planetary gearing.

Fig. 24 (Sheet 5) is a detail in left side elevation of the planetary gearing shown in Fig. 23.

Figure 25:
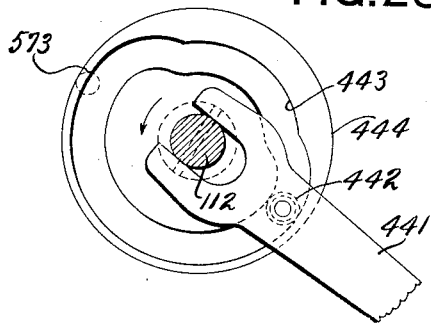

Fig. 25 (Sheet 10) is a detail view of the cam and pitman for rocking the coupling pinion shown in Fig. 14 into and out of engagement with the pair of gears one of which is shown in said figure.

Fig. 26 (Sheet 12) is a detail view of the cam and arm that release the coin ejectors for operation.

Fig. 27 (Sheet 12) shows the cam which actuates the selected coin ejectors.

The machine of the patent referred to is provided with a ticket issuing mechanism for each denomination or price of tickets and a bank of price keys operable to couple the operating mechanism to the desired ticket issuing mechanism, and also release the machine for operation.

The machine is also provided with a bank of keys numbered from 2 to 5 which control the duration of operation of the operating mechanism to issue from 2 to 5 tickets as desired. This bank also contains a release key by means of which any depressed number key can be released if the wrong key has been depressed.

In the machine as shown in the present application there is another bank of keys. These are the amount tendered keys. These keys represent the following amounts: 10¢, 25¢, 50¢, 75¢ and $1.00. These keys control the positioning of a segment gear which sets a disk forming part of the change computing mechanism, to different positions to represent the amount tendered.

The ejection of the proper change is controlled by a series of notched disks fast on a shaft which is positioned by a system of planetary gearing adjusted under the control of the price, number and amount tendered keys.

It will sometimes happen that the amount tendered will be such that no provision is made for it in the amount tendered keys. As a consequence there is provided a series of keys, one for each coin tube, the depression of which will eject coins from their corresponding coin tubes. Thus it is apparent that the operator is enabled to make change for any odd amount which may be tendered by simply depressing the proper change keys.

It will also sometimes happen that two or more tickets of different prices will be required. It is evident that change should not be issued until the tickets of the two prices have been issued at which time the difference between the total amount of all of the tickets issued and the amount tendered should be ejected in change. Therefore, there is provided what may be called the "Two price ticket key." Upon an operation, such as just mentioned, this ticket key is depressed and such depression prevents the issuance of change until all of the tickets of different prices, which are to be paid for out of the amount tendered, are issued.

No totalizer mechanism is shown or described in the present application as it forms no part of the present invention. However, totalizing mechanism can be very easily applied thereto and reference is again made to the above mentioned patent to Francesco Skerl, in which a suitable form of totalizer and counting mechanism is shown.

Amount keys.

Figure 1:
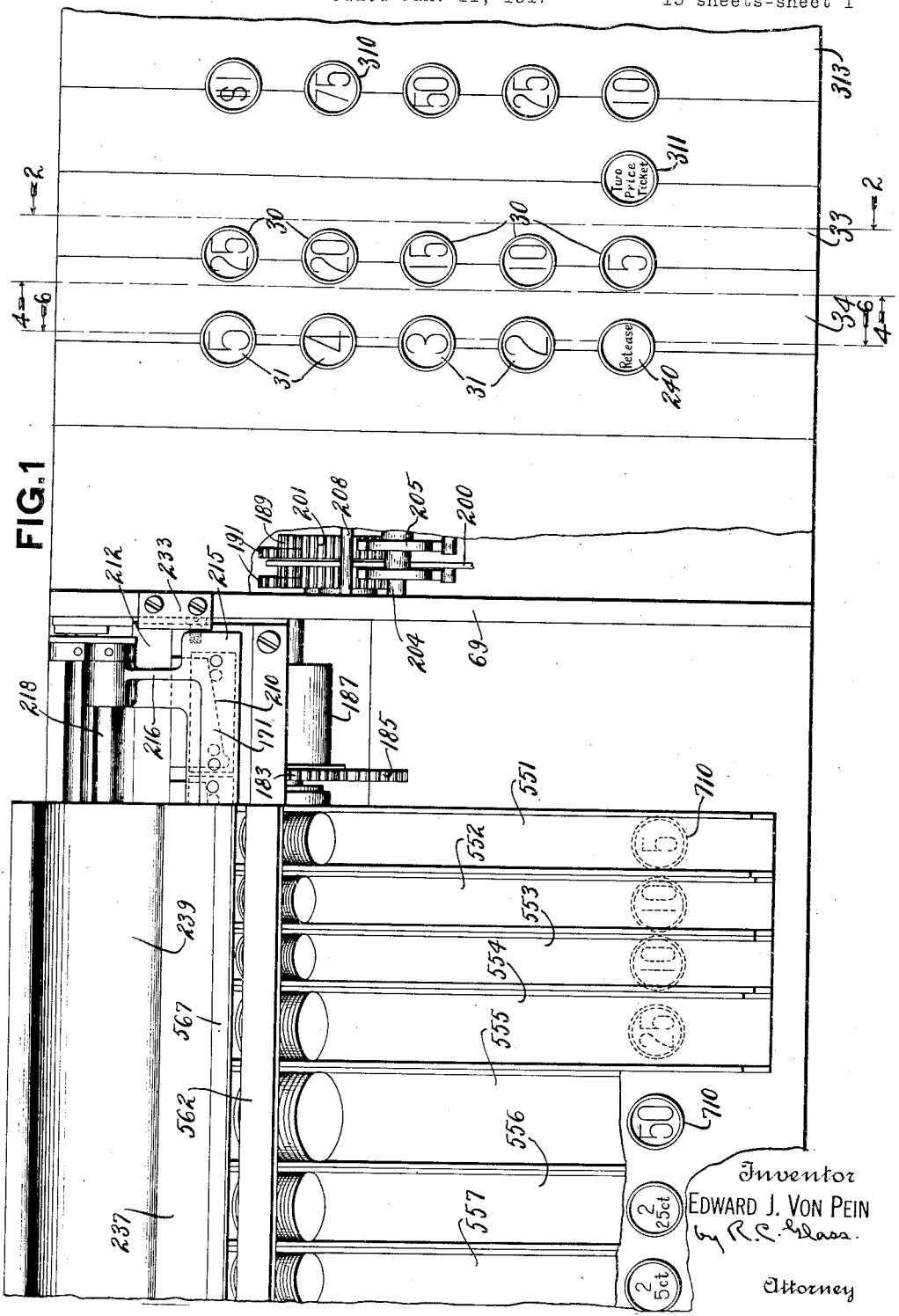
Fig. 1 is a top plan view of the machine of the present invention showing the keyboard, the coin tubes, the keys for manually ejecting coins from the coin tubes, part of the ticket issuing mechanism, and also part of the mechanism for selecting the ticket issuing mechanism to be operated.

The above description briefly points out the general features of the machine constructed in accordance with the invention. The details appear in the drawings in which 30 represents the price keys for determining the price of the ticket or tickets to be issued and 31 represents the number keys which determine the number of tickets to be issued. As shown in Fig. 1 these keys are arranged in two rows or banks near the right hand side of the machine. As the machine is designed to issue but one ticket upon operation of a price key when no ticket key is operated, the various mechanisms of the machine and their operation, when only a price key is operated, will be first described and then the devices controlled and operated by the number keys for causing a variable duration of operation of these mechanisms when a number key as well as a price key is operated will be taken up in detail.

Figure 2:
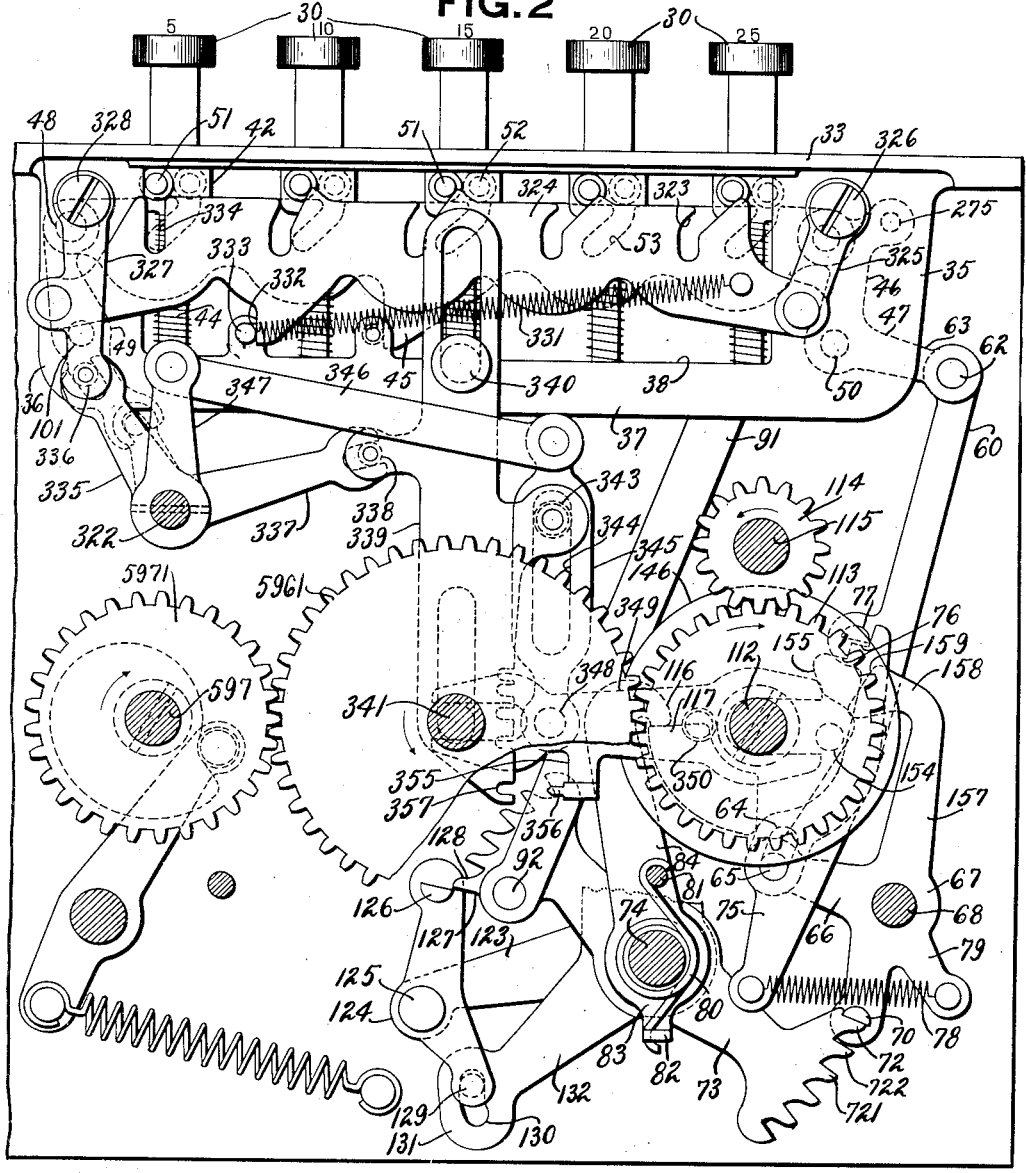
Figure 2 is a transverse vertical section taken on the line 2—2 (Fig. 1) and looking in the direction of the arrows but showing the differential mechanism and the machine locking mechanism controlled by the keys in the price or denominational bank and also showing the main driving connections.

The price keys are slidably mounted in ways or notches cut in the left hand edge of a plate 33 (Figs. 1 and 2) which extends across the top of the right hand side of the machine. The right hand edge of a plate 34, which is constructed similarly to the plate 33, contacts with the left hand edge of the latter plate to retain the keys in their ways or notches. The plate 33 has arms 35 and 36 (Figs. 2, 3 and 4) projecting downwardly from the lower surface of the plate near its rearward and forward end respectively. These arms are connected at their lower ends by a bar 37, thereby forming a frame having a rectangular opening 38. The horizontal bar 37 of this frame on its left hand side is provided with vertical slideways or guides 39 (Fig. 3) in which the lower ends of the price keys engage to guide the keys in their vertical movement. A plate 40 (Fig. 4) of approximately the same length as the horizontal bar 37 is fastened by screws 41 to the left hand side of the bar 37 to prevent any lateral movement of the lower ends of the keys in their respective slideways or guides 39. The keys are equipped with shoulders 42 which normally engage the under surface of the plate 33 to limit the extent of outward movement of the keys. Springs 44 coiled about the shanks of the keys and under compression between the bar 37 and the shoulders 42 serve to retain the keys in their normally undepressed positions and also serve to return the keys to these positions upon being released near the end of the operation of the machine.

Machine and key locking mechanism.

A complete depression of an amount key 30 releases the machine and also causes movement of a detent for locking the depressed key in its operated position and preventing an operation of the other keys in the bank during an operation of the machine. The mechanism by which these results are accomplished will now be described.

Figure 3:
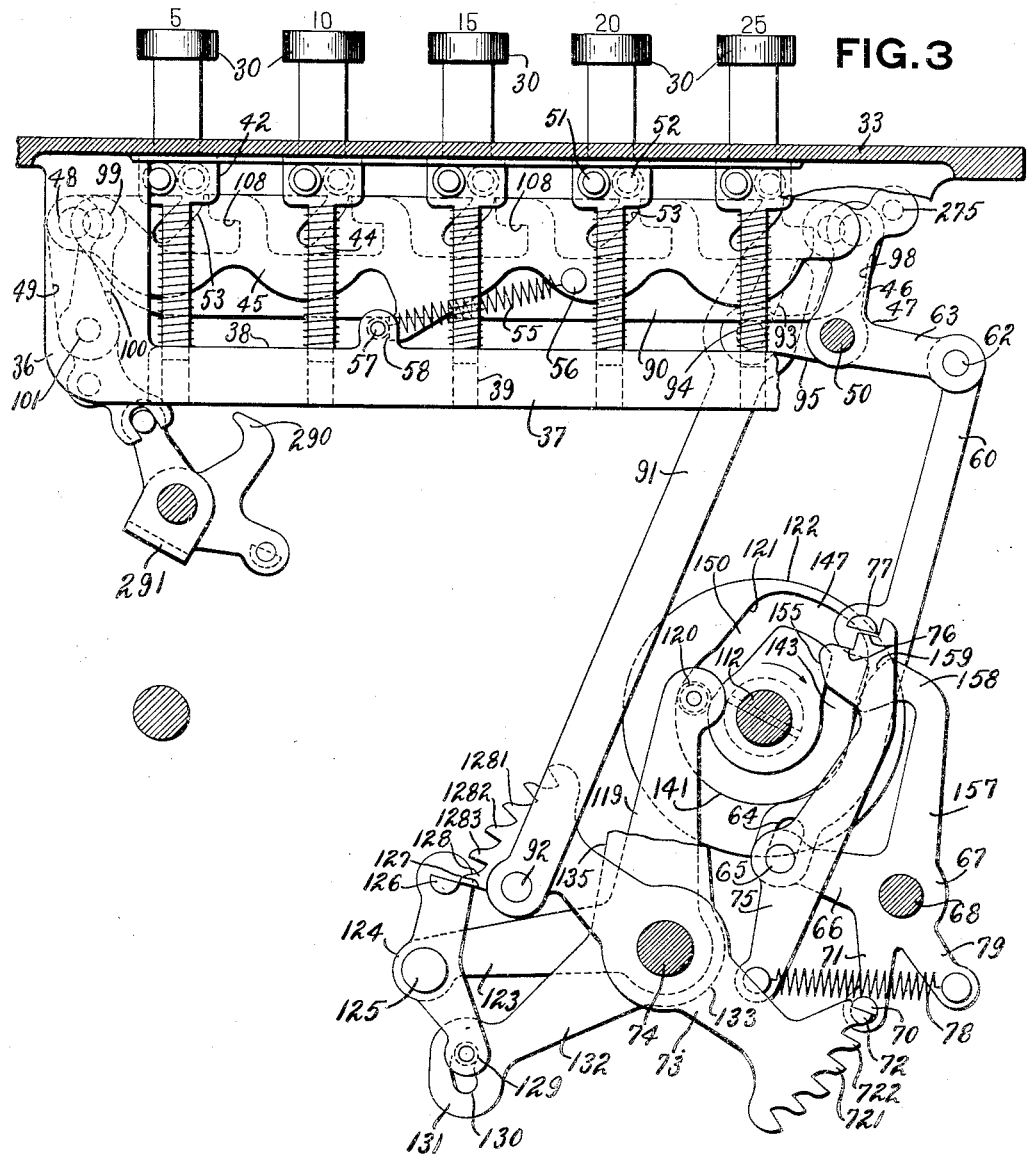
Figure 3 is a transverse vertical section taken on the line 2—2 (Fig. 1) and looking in the same direction as Fig. 2 showing part of the mechanism shown in Fig. 2.
Figure 4:
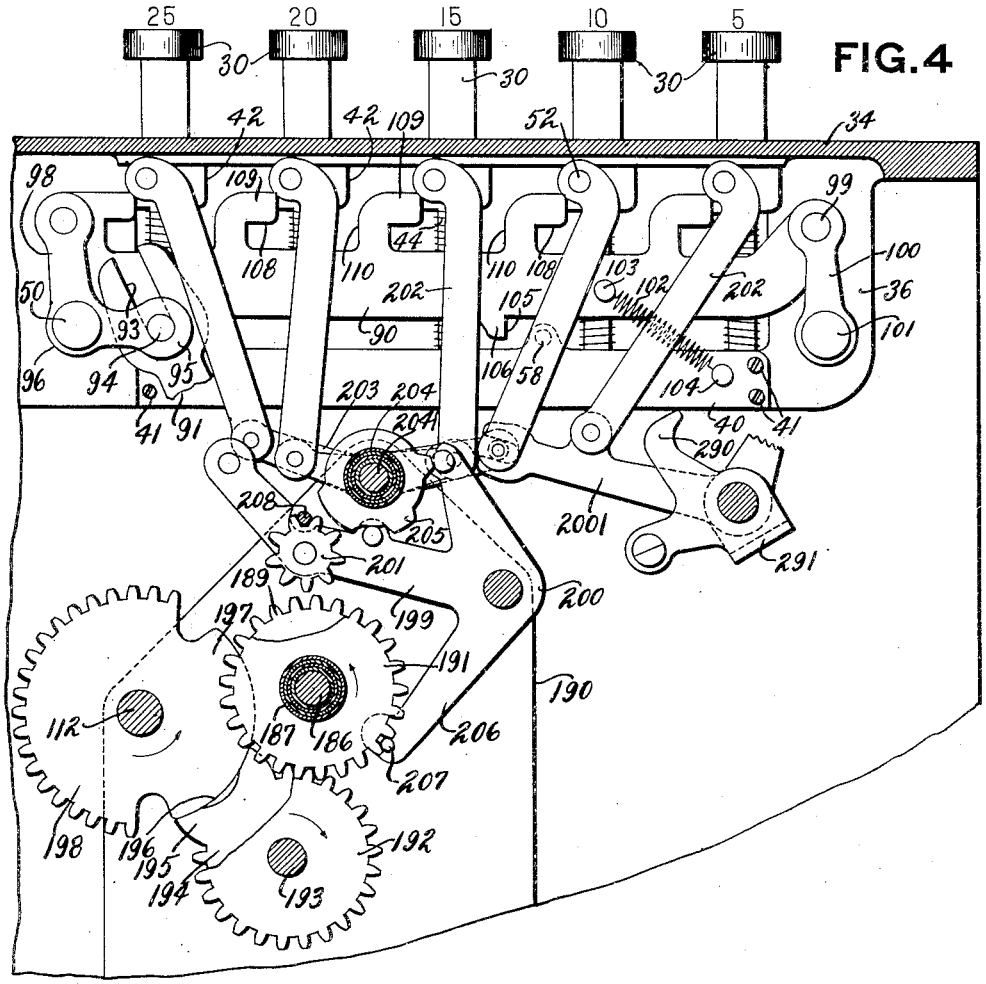
Figure 4 is a transverse vertical section taken on the line 4—4 (Fig. 1) and looking in the direction of the arrows with the driving connections and also the mechanism controlling the differential positioning of the actuators for the totalizing mechanism removed.

A movable plate 45, shown in detail in Fig. 8 and in assembled position in Fig. 3, is pivotally connected at its rear end to the vertically extending arm 46 of a bell crank lever 47, and the opposite end of the plate 45 is connected at 48 to the upper end of a lever 49. As shown in Fig. 3, the bell crank lever 47 is pivoted by a pin 50 to the key frame and the lever 49 is pivoted by a pin 101 to the key frame. Each key is provided with two pins 51 and 52 projecting from opposite sides of the key. When a key is depressed the pin 52 enters an inclined slot 53 in the plate 45 and as the slots 53 all have the same inclination, the depression of any one of the amount keys moves the plate 45 rearwardly the same extent, swinging the levers 47 and 49 about their pivots. The plate 45 is moved against the tension of a spring 55 (Fig. 3) connected at 56 to the plate and at the opposite end to a stud 57 on the key frame. The engagement of a downwardly extending projection 58 on the plate with the stud 57 prevents the spring 55 from pulling the plate forwardly past normal position.

Movement of this plate in the manner just described effects the unlocking of the machine through the following described mechanisms. A link 60 (Figs. 2 and 3) is pivoted at 62 to the horizontally extending arm 63 of the lever 47 and at its lower end the link has a slot 64 into which a pin 65 projecting from an arm 66 passes. The arm 66 forms part of a multi-armed member 67 which is loosely mounted on a rod 68, carried by the right hand side frame and a central supporting frame 69 (Fig. 1). The flat face of a stud 70 which projects from a downwardly projecting arm 71 of the member 67 is normally in engagement with a projection 72 on the rear end of a lever 73 which is fast to a shaft 74 supported by suitable bearings in the right hand side frame of the machine and the central frame 69. Attached to the side of the link 60 is a flat sided stud 77 normally resting above the upper one of a pair of shoulders 76 formed on the upper end of a lever 75 pivotally mounted on the pin 65. A spring 78 stretched between the lower end of the lever 75 and the multi-armed element 67 normally holds the parts in the positions shown. When one of the amount keys 30 is depressed the plate 45 is moved rearward rocking the bell crank lever 47. Such movement of the lever 47, through the link 60 and the arm 75 forming a positive connection between the link 60 and the multi-armed member 67, rocks the member 67 counter clockwise as viewed in Figs. 2 and 3 to carry the stud 70 out of engagement with the projection 72 on the lever 73. The lever 73 is then rocked counter-clockwise by a spring 80 (Fig. 2) coiled about the shaft 74, one end of the spring being bent around a stud 81 projecting from the right hand frame of the machine while the other end of the spring is bent about a lug 82 projecting laterally from a downwardly extending portion 83 of a locking arm 84 rigidly mounted on the shaft 74.

A stepped member 85 (Fig. 6) is also rigidly mounted on the shaft 74. The construction of this stepped member will be more fully described hereinafter. It will be sufficient to say here that the foremost stop or step 86 is normally one step of movement of the member 85 from a plate 87 on the lower end of a downwardly extending arm 88 of a bell crank lever 89, which is loosely mounted on the rod 68, and is adapted to be adjusted differentially by the number keys 31 in a manner to be described later. When but one ticket is to be issued this lever 89 is not moved from normal position as no number key is operated so that when an amount key is operated and the stud 70 (Figs. 2 and 3) is taken out of engagement with the projection 72 on the lever 73, the spring 80 coiled about the shaft 74 will move the shaft 74, the stepped plate or member 85 and the lever 73 one step in a counter clockwise direction. This one step of movement is limited by the engagement of the first step 86 of the stepped member 85 with the plate 87.

Movement of the lever 73 from normal position in the manner just described permits movement of a locking detent 90 (Figs. 3, 4 and 7) to lock the depressed price key in operated position until near the end of the operation of the machine and also to lock the other keys against operation. The means by which this is accomplished is best shown in Fig. 3. A link 91, which is pivoted to the forward end of the lever 73 by a pin 92, has a slot 93 (Figs. 3 and 4) the lower end of which normally engages a pin 94 projecting from a forwardly extending arm 95 of a bell crank lever 96 pivoted on the pin 50. The upwardly extending arm 98 of the lever 96 pivotally supports the locking detent 90. The forward end of the detent 90 is pivoted by a pin 99 to the upper end of an arm 100 pivoted on the pin 101. A spring 102 (Figs. 4 and 7) connected at one end to a pin 103 on the detent and at the other end to a pin 104 on the key frame, tends to draw the plate forward but such movement of the detent is prevented by the link 91, which, when the lever 73 is in its normal position holds the lever 96 and therefore the detent 90 against forward movement. When, however, a price key is operated and the lever 73 is rocked counter clockwise by the spring 80 the lower end of the slot 93 of the link 91 is carried downward out of engagement with the pin 94 on the lever 96 to permit the spring 102 to draw the detent 90 forward until such movement is limited by the engagement of a vertical edge 105 of a projection 106 on the detent with the pin 58 on the key frame. Upon forward movement of the detent 90 the lower edge 108 of the horizontal portion 109 of one of the projections 110 on the detent passes over the pin 52 of its respective key, if the key is operated, to retain the key in depressed position and the upper edges of the horizontal portions of the other projections 110 pass below the pins 52 of their respective keys to prevent the operation of these keys during the operation of machine.

Most of the mechanism is driven from a shaft 112 extending across the machine. This shaft is given from one to five complete rotations at each operation depending upon the number of tickets to be issued, one ticket being issued at each rotation. The shaft may be turned either by means of the usual operating handle or by means of a motor having operating and circuit controlling connections of the type fully shown and described in U. S. Letters Patent No. 1,144,418 issued June 29, 1915 to Chas. F. Kettering and William A. Chryst. Neither the operating handle nor the motor is shown in the drawings, as they form no part of the present invention.

The main driving shaft 112 is rotated by the engagement of a gear wheel 113 (Fig. 2) rigidly mounted on it with a gear wheel 114 rigidly mounted on a shaft 115 driven by the handle or motor. The upper end of the arm 84 previously mentioned carries a projection 116 and the lower edge of this projection normally engages the upper edge of a plate 117 fastened to the side of a disk 146 fast on the shaft 112. When the shaft 74 is rocked by the spring 80 the projection 116 of the arm 84 is moved out of engagement with the plate 117 to permit rotation of the drive shaft 112.

The depressed key is not released and the machine locking arm 84 is not returned to normal locking position until near the end of the operation of the machine, but as the operating mechanism effects the release of the depressed key and the restoration of this locking member to normal position through the mechanism just described, this operation of the mechanism may be described here. A bell crank lever 119 (Fig. 3) carries at the upper end of its vertical arm a roller 120 which engages in a cam groove 121 formed in the face of a disk 122 fast on the drive shaft 112. The other arm 123 (Figs. 2 and 3) of the lever 119 carries a lever 124 centrally mounted on a pin 125. From the upper end of the lever 124 projects a stud 126 which is semi-cylindrical in shape and is normally held with its flat surface out of the path of movement but almost in the same plane as the lower flat edge 127 of the lowermost projection or stop 128 on the forward edge of the lever 73 so that when the lever 73 is rocked one step in a counter clockwise direction and just before movement of the lever 119 is effected, as will be described, the stud 126 will be just one step of movement above the lowermost projection 128. The lower end of the lever 124 carries a roller 129 playing in a slot 130 in an enlarged portion 131 of an arm 132. The arm 132 forms part of a bell crank lever 133 pivoted on the shaft 74. The upwardly extending arm 135 (Fig. 6) of the lever 133 is equipped with a roller 136 extending into a cam groove 137 formed in the face of a disk 138 fast on the drive shaft 112.

The operation of the above described mechanism for returning the machine locking lever 84 to normal position and for moving the locking detent 90 out of locking position is as follows. Depression of a price key, as already explained, moves the plate 45 rearward and because of the engagement of the shoulder 76 with the stud 77 on the link 60, the member 67 is rocked counter clockwise (Figs. 2 and 3) to carry the stud 70 on the member 67 out of engagement with the projection 72 on the rear end of the lever 73. The locking arm 84 upon movement of the shaft 74 is rocked out of locking position and its movement is limited by the engagement of the top stop 86 of the stepped plate 85 with the plate 87 on the lever 89, which has not been moved when but one ticket is to be issued. When the machine is released the driving shaft 112 is given one complete rotation in a clockwise direction, but one rotation being required for a complete operation of the machine when but one ticket is to be issued. During approximately the first half rotation of the drive shaft 112 the lever 119 (Fig. 3) and the lever 133 (Fig. 6) are not moved by their respective cam grooves 121 and 137 as the roller 120 on the lever 119 plays in a concentric portion 141 of its cam groove while the roller 136 on the lever 133 rides in the concentric portion 142 of its cam groove 137. While the roller 120 is passing into the eccentric portion 143 of its cam groove 121 the lever 119 is rocked counter clockwise so that the flat surface of the stud 126 on the lever 124 is carried into the same relative position with the lower edge of the lowermost projection 128 on the forward end of the lever 73 that it is in when these levers are in normal position. In this position, it will be remembered, the flat surface of the stud 126 is slightly lower than the lower edge of the projection 128. During this counter clockwise movement of the lever 119 the roller 136 on the lever 133 is playing in the eccentric portion 145 of its cam groove 137 and as this portion of the cam groove 137 is nearly like the eccentric portion 143 of the cam groove 121 the levers 119 and 133 are moved nearly as a unit so that the engagement of the pin 129 on the lever 124 with the upper end of the slot 130 in the lever 133 is maintained. The roller 120 on the lever 119 then plays in the second concentric portion 147 of its cam groove 121 and the lever 119 is held stationary during this period, but as the roller 136 on the lever 113 is at this time working in the eccentric portion 148 of its cam groove 137, it rocks the lever 133 clockwise relative to the now stationary lever 119 so that the lower end of the slot 130 is carried up into contact with the pin 129 on the lever 124. The slot 130 in the lever 133 is so constructed that the lever 124 is rocked in a clockwise direction and the stud 126 is thereby carried under the projection 128 of the positioned lever 73. When the roller 120 on the lever 119 works in the eccentric portion 150 of its cam groove 121 and the roller 136 works in the eccentric portion 151 of its cam groove 137 the levers 133 and 119 are rocked as a unit in a clockwise direction so that the lever 73 and therefore the shaft 74 and arm 84 fastened thereto are rocked into normal position. Finally the lever 133 is given a reverse movement, that is, in a counter clockwise direction relative to the lever 119 so that the lever 124 is rocked in a counter clockwise direction through the slot 130 and pin 129 to carry the stud 126 out of engagement with the projection 128 on the forward end of the lever 73.

Simultaneous with the rocking of the lever 124 so that the stud 126 is taken out of engagement with the projection 128 on the lever 73 the multi-armed member 67 is restored to normal position so that the stud 70 on the arm 71 of the member 67 is again brought into engagement with the flat surface of the projection 72 on the lever 73 in order to retain the lever 73 in normal position until the next operation of the machine. To accomplish this object a stud 154 (Fig. 2) projecting from the side of the disk 146 engages an inclined face 155 on the upper end of the lever 75 and forces the upper end of the lever rearward so that the upper shoulder 76 is carried out of engagement with the stud 77 on the link 60. The rocking of the member 67 to initial position by the spring 78 is then permitted with the depressed key remaining in operated position as the pin 65 on the arm 66 of the member 67 by reason of the upper shoulder 76 having been thrown out of engagement with the stud 77 can be moved out of engagement with the lower end of the slot 64 in the link 60 and into engagement with the upper end of the slot. To make such return movement of the member 67 positive an upwardly extending arm 157 of the member 67 is provided with a projection 158 having an inclined edge 159 so that the stud 154 will engage the edge 159 after the upper shoulder 76 of the lever 75 is carried out of engagement with the lug 77, and thereby positively restore the lug 70 on the member 67 to its locking position over the projection 72 on the lever 73.

The restoration of the lever 73 to normal position in the manner just described raises the link 91 (Fig. 3) so that the lower end of the slot 93 in the link engages the stud 94 on the lever 96, which supports one end of the locking detent 90 and moves the detent rearwardly against the tension of the spring 102 to carry the projections 109 out of the path of movement of the pins 52 on the amount keys. The detent is held out of locking position by the link 91 and the lever 73 until the next operation of the machine.

It will be remembered that in order to permit the rocking of the member 67 to initial position with the depressed key remaining in operated position the upper shoulder 76 of the arm 75 is driven out of engagement with the stud 77 on the link 60. After the member 67 is brought to initial position the lower shoulder 76 of the arm 75 will just touch the stud 77 without restoring the link 60 to normal position. The restoration of the link 60 to initial position takes place when the price key is returned to undepressed position as the lever 47 is then rocked counter clockwise (Fig. 3) raising the link 60 after which under the action of the spring 78 the upper shoulder 76 will be brought under the stud 77. It will be seen from this that the depressed key must first be returned to undepressed position before the machine can again be operated.

*Ticket issuing mechanism.*

As stated above, the machine is adapted to print and issue tickets of five different denominations. For this purpose there are five printing mechanisms each of which prints and issues tickets from a separate paper strip. These strips may be of different colors if desired. One of the strips is shown at 165 (Figs. 19$^A$ and 19$^B$). Each strip is fed from a separate ticket roll which is under the machine, but is not shown in the drawings, upward through a guide 167 between a roller 168 and a platen roller 169 through another guide 170 past a movable severing knife 171 and finally through an opening in the top of the cabinet of the machine. Each roller 168 has atached to its periphery the usual type plate (not shown) for printing any desired matter in connection with the price of the ticket. Inking rollers 172, one for each roller 168, are carried by rods 173 which rest in recesses 174 at the upper ends of the arms 175 of yokes 176 mounted on a rod 177. The inking rollers are held at position to ink the type plates by means of springs 178 (Fig. 19$^B$) coiled about the rod 177 which is supported by plates 179 projecting from the guide 167 for the ticket strips. Eccentrics 180 carried by a rod 181 supported by the plates 179 are employed to control the degree of contact between the type plates and the inking rollers.

Figure 5:
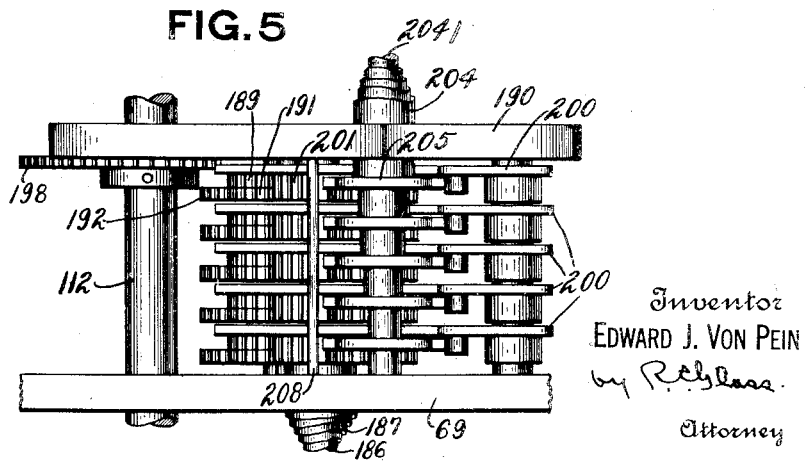
Fig. 5 is a top plan view of the selecting mechanism shown in Fig. 4.

The rollers 168 for the 5, 10, 15, 20 and 25¢ ticket strips are rotated through gears 182 rigid with the rollers and meshing with gears 183 of the same size fast to the platen rollers 169 (Fig. 19$^B$). These platen rollers 169 and the rollers 168 serve as the feeding means for the ticket strip as is well known in the art. The gears 183 in turn mesh with gears 185 which are of the same size as the gears 183 and fast to a shaft 186, and sleeves 187. The shaft 186 is supported at its ends by a frame 190 (Figs. 4 and 5) and the left hand side frame of the machine. Whenever one of the ticket issuing devices is selected to issue a ticket either the shaft 186 or the proper sleeve 187 is connected to the driving mechanism. As a result, the pair of rollers 168 and 169 for the selected strip will be given one complete rotation at each rotation of the main drive shaft. The means for selectively coupling the desired ticket issuing device to the main operating mechanism will now be taken up in detail.

The shaft 186 and each of the sleeves 187 have rigidly mounted thereon gears 189 (Figs. 4 and 5) and these gears are the same size as the gears 185. The gears 189 are mounted on the right hand ends of the shaft 186 and sleeves 187 and are between the central frame 69 and the frame 190. Loosely mounted on the shaft 186 and sleeves and beside the gears 189 are companion or idle gears 191. These gears 191 mesh with gears 192 having the same number of teeth and all rigidly mounted on a shaft 193 supported in suitable bearings in the frames 69 and 190. At the right hand end of the shaft 193 is rigidly mounted a mutilated gear 194 (Fig. 4) the locking portion 195 of which engages the periphery 196 of a locking portion 197 of another mutilated gear 198 fast on the driving shaft 112. Upon rotation of the driving shaft 112 in a counter clockwise direction (Fig. 4) the periphery of the locking portion 196 of the mutilated gear 198 slides out of contact with the locking portion 195 of the mutilated gear 194 and the teeth of the mutilated gear 198 engage the teeth of the mutilated gear 194. As the mutilated gears have the same diametral pitch and as the geared portions thereof are of proper extent upon each complete rotation of the shaft 112 the shaft 193 will also be given one complete rotation and the latter shaft will complete its rotation ahead of the former. The purpose of this construction is to cause the selected ticket mechanism to print and feed the ticket into position to be severed before the severing and other mechanism actuated by the shaft 112 are operated.

To selectively connect one of the gears 189 rigid with the shaft 186 or one of the sleeves 187 with its companion gear 191, rearwardly extending arms 199 of five members 200 (Figs. 4 and 5) carry coupling pinions 201 each of which is as wide as the combined width of a pair of the gears 189 and 191. When a key 30 is operated it will, through a link 202 connected thereto, rock a corresponding arm 203, sleeve 204 and cam disk 205 fastened to the sleeve and the cam disk in turn cooperates with pins on the corresponding member 200 to rock the member 200 counter clockwise and thereby lower the coupling pinion 201 carried by said member into mesh with its corresponding pair of gears 189 and 191, as fully described in the aforesaid Skerl patent. The link 202 for the 5¢ key is connected to an arm 2001 through which the corresponding arm 203 is operated. This arm 203 is fast on a shaft 2041 carrying the disk 205 appropriate to the printing mechanism for issuing 5¢ tickets. Arms 206 of the members 200 carry pins 207 at their free ends and the pins normally engage between the teeth of the gear wheels 189 fast to the shaft 186 and sleeves 187 to prevent the rotation of the sleeves and shaft when the pinions 201 are not in engagement with their respective pair of companion gears 189 and 191. When a pinion, however, is lowered into engagement with its pair of companion gears the pin 207 is carried out of contact with the teeth on the gear 189 to permit rotation of the sleeve 187 or shaft 186 carrying the gear. When the coupling pinions 201 are in their normal position they engage a rod 208 extending between the central frame of the machine and the auxiliary frame 190 to properly align the pinions.

As shown in Fig. 11 there are five of the movable severing knives 171, one for each ticket issuing device, and each of these knives 171 is designed to cooperate with a corresponding stationary knife edge 210. Each of the stationary knife edges 210 is formed in a plate or bar 211 rigidly mounted on the top of a frame 212 (Figs. 11 and 19A). It can be seen from Fig. 19B that the guides 170 for the ticket strips pass up through the central vertical opening formed between two bars 213 and 214 of the frame 212. The movable knives 171 are carried on a frame consisting of a horizontal bar 215 extending over the stationary knife edges and integral at its ends with arms 216 and 217 which are fast to a shaft 218 which is loosely carried at its ends by two arms 219 rigidly mounted on a shaft 220 (Fig. 19B). Loosely mounted on the shaft 220 on the right hand side of arm 219 rigid with the left hand end of the shaft 220 is a bell crank lever 221, the upwardly extending arm 222 of which is bifurcated to straddle the end of a rod 223 which extends to the left of the arm 219, the rod being carried by the arms 219. The other arm 224 of the bell crank lever 221 is pivoted at 225 to a pitman 226. The pitman 226 at its lower end is forked over the driving shaft 112 to permit reciprocation of the pitman. A cam groove 227 in the face of a disk 228 fast to the drive shaft 112 receives a roller 230 projecting laterally from the pitman 226. When the drive shaft 112 is turned upon an operation of the machine the pitman 226 is driven upward by the cam groove 227 and through the bell crank lever 221 throws the knife carrying frame rearward to withdraw the movable knives 171 from over the opening in the guide 170. The printed ticket is then fed between its movable knife and the stationary knife and when the pitman 226 is restored to normal position the knife frame will be given a forward movement to sever the ticket.

The arms 216 of the knife carrying frame are equipped with rollers 232 (Fig. 19A) which work against the under surfaces of plates 233 (Fig. 11) fastened by screws to the top of the central frame 69 and to the left hand side frame of the machine. These rollers 232 and plates 233 are provided to guide the knife supporting bar 215 in its transverse movement and prevent the movable knife edges from being raised. The movable knives are all connected to the horizontal bar 215 of the knife carrying frame by two pins 235 which loosely pass through holes in the bar 215. Plungers 234 are seated in the bar 215 and are provided with compression springs resting on top of the movable knives and holding the movable knives in sliding engagement with the stationary knife.

As shown in Fig. 19B the rod 223 connecting the two arms 219 of the movable knife carrying frame is provided at its left hand end with a knurled knob or button 1235 and a spring (not shown) is coiled about the rod between a collar fast on the rod and the left hand side frame 219. When a new ticket strip is being inserted into the machine it is desirable to cut off the inserted end of the strip as the end is usually ragged and to accomplish this the operator need only grasp the knob 1235 and pull the rod 223 to the left against the action of the spring (not shown) coiled about the shaft. This carries the right hand end of the shaft 223 out of engagement with the bifurcated end of the arm 222 of the bell crank lever 221. The knife frame can then be operated manually independently of the bell crank lever 221 and after the end of the ticket roll has been pushed up between the knife edges the operator restores the knife frame to normal position to sever the ragged end of the ticket roll and then release the hold on the button or knob 1235 to permit the spring to reengage the end of the rod 223 with the recess in the arm 222 of the lever 221. To prevent the knife frame from being drawn backward too far a spring pressed plunger 236 projects upwardly from the frame 212 to limit the extent of the backward movement of the frame 216. A plunger rather than a stationary stud is provided for assembling purposes only as the plunger can be pushed downward to permit the assembling of the knife frame in place.

As a ticket is fed up into position to be severed its strikes the under side of guide plates 237 (Fig. 19A) and is deflected so that its end protrudes through a slot 238 between the upper guide plate 237 and a receptacle 239 into which change is ejected by the ejecting mechanism described later. This arrangement is conducive to speed in handling transactions as it permits the purchaser to seize the protruding ends of the tickets and withdraw them from the machine and, with substantially the same movement, sweep the change out of the receptacle 239.

*Number keys.*

The number keys 31 (Figs. 1 and 6) as above stated, are mounted in the frame 34 similar to the price key bank frame 33 and are constructed similarly to the price keys. The first key 240 in the number bank is a release key for permitting the restoration of an operated number key to its initial or outer position before a price key is operated. As operation of the price keys releases the motor and closes the motor circuit it is desirable to provide a temporary locking detent for temporarily retaining the operated number key in depressed position until the release key 240 or a price key 30 is operated and also to provide another detent which is actuated by the price keys to retain the operated number key in depressed position until near the end of the operation of the machine. The temporary locking detent is shown at 241 in Fig. 10 and this detent as well as the permanent locking detent 265 is shown assembled on the key frame in Fig. 6. At its forward end the temporary detent 241 is pivotally mounted on an arm 243 by a pin 244 and the arm at its lower end is pivotally mounted on a pin 245 attached to the downwardly extending portion 246 of the key frame. At its rear end the detent is connected by a pin 247 to the upper end of a lever 248 pivotally secured to the downwardly extending portion 249 of the key frame by a pin 250. The pins 52 projecting from the left hand side of the shoulders 42 of the number keys normally engage the inclined edges 251 (Fig. 10) of projections 252 on the upper edge of the temporary detent 241. Depression of a number key through the engagement of this pin 52 with the inclined edge 251 causes the detent 241 to move forward until the pin 52 of the depressed key passes out of engagement with the shoulder 255 of its projection 252 on the detent when a spring 257 connected at one end to a pin 258 projecting from a portion 259 on the lower edge of the detent and at its other end to a pin 260 (Fig. 6) projecting from the portion 249 of the key frame draws the detent rearward. In this position of the detent the shoulder 255 passes over the pin 52 on the depressed key and holds the key in depressed position. The rearward movement of the temporary detent 241 is limited by the engagement of the vertical face of the shoulder 262 on the lower edge of the detent with a pin 263 on the key frame. If it is desired to again move the detent forward to release the operated number key, as for example, when the wrong number key is operated, the release key 240 is operated before the price key is operated so that the pin 52 on the release key engages the beveled edge 264 on the detent and moves the detent rearward the same extent as it was carried forward, thereby carrying the shoulder 255 of the projection 252 away from the pin 52 on the operated number key to permit the spring 44 coiled about the shank of the key to restore the latter to normal position.

As each ticket is issued the temporary locking detent 241 is moved forward far enough to release the operated number key, the permanent locking detent 265 being employed to retain the operated number key in depressed position until after all of the tickets have been issued. The lower end of the lever 248 which supports the rear end of the temporary detent 241 is in the path of movement of a roller 266 (Fig. 6) on the arm 135 of the lever 133. As the roller 136 on the arm 135 passes upon every rotation of the shaft 112 from the portion 148 of its cam groove 137 to the portion 151 the arm 135 is drawn rearwardly far enough to effect, through the engagement of the roller 266 with the lever 248, forward movement of the temporary detent 241 so that the shoulder 255 is carried away from the pin on the key, in order to permit restoration of the operated key if the permanent detent 265 is moved out of locking position at the same time.

The detent 265 for retaining the operated number key in depressed position until near the end of the operation of the machine is slidably mounted on the key frame, as a pin 268 projecting from the frame passes through a slot 269 in the rear end of the detent and a pin 270 also projecting from the key frame passes into a notch 271 in the forward end of the detent. This detent 265 is similar to the locking detent 90 for the price bank. When a number key is depressed and the detent 265 is moved rearward upon the operation of a price key a corresponding projection 272 on the detent passes over the pin 51 projecting from the right hand side of the shoulder 42 of the number key and locks the key in depressed position. Movement of this detent 265 is effected by the price keys, as the lever 47 supporting the plate 45 (Fig. 8) which is moved rearward by the operated price key carries a pin 275 (Fig. 6) engaging a notch 276 in the rear end of the detent 265. From this description it can be seen that the plate 45 and the key detent 265 are moved as a unit and therefore as the plate 45 is not restored to normal position until near the end of the operation of the machine the depressed number key will not be released until the same time.

*Mechanism controlling the variable operation of the machine.*

For the purpose of determining the number of tickets to be issued at a single operation of the main operating mechanism the bank of number keys 31 is provided with a movable plate 280 (Figs. 6 and 9) pivotally carried at its rear and forward ends respectively by upwardly extending arms 281 and 282 of levers 283 and 284, pivoted on the pins 250 and 245. The pins 51 on number keys cooperate with inclined edges 286 of notches 287 in the plate 280. These notches are inclined downwardly and forwardly with varying inclinations, however, and the lower ends of the notches are vertical. An arm 289 of the lever 284 (as shown in Fig. 6) is normally raised out of the path of movement of a projection 290 of a pivoted yoke 291 which is rocked forward by the price keys through the lever 49 and plate 45. After a price key is depressed a ticket key cannot be operated as the top of the projection 290 is then under the arm 289.

The pin 52 on the release key 240 is adapted to engage the inclined edge 294 of a beveled projection 295 on the plate 280, to move the plate 280 slightly rearward so that the engagement of the rear side of the slot 287 with the key pin cannot frictionally retain the key in depressed position. A spring 297 connected to the movable plate 280 at 298 and the key frame at 299 tends to retain the detent in normal position. A shoulder 300 projecting from the lower edge of the plate 280 cooperates with the stud 263 on the key frame to prevent movement of the plate past normal position.

The rearwardly extending arm 301 of the bell crank lever 283 is connected by a pin 302 to a link 303 which at its lower end is pivotally secured by a pin 304 to an arm 305 of the bell crank lever 89.

When a number key is operated it differentially moves the plate 280 rearward by cooperation of the pin 52 on the key with the inclined edge 286 of the notch 287 under the pin and through the lever 283 and link 303 the bell crank lever 89 is rocked differentially. The number of steps of movement of the lever 89 is always one step less than the number of tickets to be issued as the bell crank lever 89 is not moved from normal position when but one ticket is to be issued and in this normal position of the bell crank the stop 86 on the stepped member 85 is one step of movement of the member 85 from the plate 87 on the bell crank 89. For example when the two ticket key is depressed the lever 89 will be given but one step of movement and when the five ticket key is depressed it will receive four steps of movement.

After the proper ticket key is depressed a price key is depressed and, as already described, the depression of a price key through the movable plate 45 (Fig. 3) lever 47, link 60 and arm 75 rocks the member 67 about its pivot 68 to carry the stud 70 on the member 67 out of engagement with the upper edge of the projection 72 on the rear end of the lever 73. If no ticket key is depressed the shaft 74 on which the lever 73, locking arm 84 and stepped plate 85 are rigidly mounted will be given but one step of movement by the coiled spring 80 as the first stop 86 on the stepped member 85, as already described, engages the plate 87 on the lever 89 which has not been moved from normal position. With the bell crank lever 89 moved differentially out of normal position, however, by a ticket key the shaft 74 and the above mentioned members fast thereto will be given a number of steps of movement depending upon the extent of movement of the lever 89. If the lever 89 has been given one extent of movement by the two ticket key, the shaft 74 and the above mentioned members rigid thereon will be rocked by the spring 80 until the second stop 861 engages the differentially positioned plate 87 and if the bell crank lever 89 has been given four steps of movement by the five key the shaft and the above mentioned members will be given five extents of movement from normal position, the extent of movement in this case being limited by the engagement of the last stop 86² on the stepped member 85 with the plate 87.

As the lever 73 is rocked differentially with the shaft 74 the link 91 pivoted to the forward end of the lever will be lowered a like extent. Upon each rotation of the main driving shaft 112 the shaft 74, lever 73 and locking arm 84 are returned one step towards normal position in a manner to be presently described, by the mechanism described above and shown in Figs. 3 and 6. The operation of the mechanism for restoring the lever 73 and the locking arm 84 step by step to normal position will be readily understood, as the lever 73 and therefore these locking arms are moved one step back toward normal position in about the same manner that they are moved their one step to normal position when no ticket key is operated. This latter operation has already been described. To render the operation of this restoring mechanism more readily understood when more than one ticket is to be issued it will be assumed that the three ticket key has been operated and a price key depressed to release the machine and start the motor. The locking arm 84 (Fig. 2) upon depression of the price key is moved three steps from normal locking position with the lever 73 (Figs. 3 and 6) so that the fourth projection from the bottom on the front end of the lever 73, and indicated by the character 128¹, will be almost in the same plane as the flat surface of the stud 126 on the upper end of the lever 124. During the first rotation of the main drive shaft 112 the bell crank lever 119 carrying the lever 124 and the lever 132 having the eccentric slot 130 engaged by the stud 129 on the lower end of the lever 124 are moved as a unit by their respective cam grooves 141 and 142, as explained above, so that the flat surface of the stud 126 is nearly in the same plane as the lower face of the third projection 128² and subsequently the levers 119 and 133 are moved nearly as a unit to move the lever 73 and therefore the locking arm 84 one step in a clockwise direction toward normal position. As the end of the first step of movement of the lever 73 is reached the stud 70 on the downwardly extending arm 71 of the multi-armed member 67 is moved into engagement with the upper face of the third projection 72¹ from the top on the rear end of the lever 73 by the spring 78 and the stud 154 (Fig. 2) engaging the inclined face 159 of the arm 157 of the member 67, the upper shoulder 76 on the arm 75 having been cammed out of engagement with the stud 77 on the link 60 by the contact of the stud 154 with the face 155 of the arm 75. The stud 126 on the lever 124 is then carried out of engagement with the projection 128² and upon the next rotation of the main drive shaft the lever 124 is lowered and moved as before by the lever 132 under the second projection 128³ from the bottom. The levers 119 and 133 are then raised as a unit to give the lever 73, locking arm 84 and the motor locking arm (not shown) their second return step of movement. During this movement the member 67 is rocked counter-clockwise, as viewed in Fig. 3, by the engagement of the lower cam edge of the projection 72² with the curved surface of the stud 70 on the member and as the stud passes out of engagement with this cam edge the stud is moved into engagement with the upper face of the projection 72² in the same manner that the stud was moved into engagement with the upper edge of the third projection 72¹. Upon the last rotation of the main drive shaft 112 the stud 126 is carried under the last projection 128 on the forward end of the lever 73, as described, when but one ticket was issued, and upon return movement of the levers 119 and 133 to raise lever 124 carrying the stud 126, the lever 73 is moved to normal position and the locking arm 84 locks the machine against further movement until a price key is depressed on the next operation of the machine. During this last step of movement the lower cam edge of the projection 72 on the rear end of the lever 73 engages the curved surface of the stud 70 and cams the stud 70 rearward and as the stud passes the point on the projection 72 it is restored to its normal position above the upper edge of the projection 72 by the spring 78 and engagement of the stud 154 with the arm 157 of the member 67.

The last step of movement of the lever 73 to normal position causes the lower end of the notch 93 (Figs. 3 and 4) in the link 91 to engage the pin 94 on the bell crank lever 96 supporting the rear end of the locking detent 90 and move the detent 90 rearward to release the depressed key 30. As the released key is restored to normal position the plate 45 and the locking detent 265 (Fig. 6) for the number bank of keys are moved forward to normal position to permit restoration of the depressed number key by its spring 44. The temporary detent 241 for the number keys is moved out of locking position at the same time by the engagement of the roller 266 on the lever 135 with the lever 248 supporting one end of the detent. The spring 297 upon restoration of the depressed keys to normal undepressed position restores the differentially movable plate 280 and the bell crank lever 89 connected thereto through the lever 283 and link 303 to normal position.

*Change determining mechanism.*

For the present purpose the mechanism for determining the amount of change to be ejected may be said to be controlled jointly by the price keys 30 and a bank of amount tendered keys 310 (Figs. 1, 12 and 13), although, as will appear later, operation of a two price ticket key 311 (Figs. 1 and 14) and the number keys 31 also affect the change making devices.

The change determining mechanism comprises a shaft 312 (Figs. 12, 14, 15, 16 and 19<sup>B</sup>) carrying coin ejector controlling disks 314, 315, 316, 317, 318, 319 and 320. Intermediate the shaft 312 and the price keys 30 and the amount tendered keys 310 is a system of planetary gearing and other connections described later whereby the shaft 312 and the ejector controlling disks attached thereto may be adjusted to any one of twenty positions to represent the difference between the amount tendered and the amount to be deducted for tickets sold. Each of the ejector controlling disks 314 to 320 inclusive controls the operation of a coin ejector and the disks are so constructed and so arranged with reference one to the other that at any position of the shaft 312 only the ejectors for ejecting coins to the value represented by the position of the shaft are allowed to operate.

The connections intermediate the shaft 312 and the bank of price keys 30 comprise a segment 321 (Figs. 14 and 17) fast to a shaft 322 which is variably oscillated by operations of the driving mechanism to extents determined by the price keys 30. For this purpose the pins 51 (Fig. 2) on the keys 30 cooperate with variably inclined slots 323 in a plate 324 at the right side of the price key bank. The plate 324 is loosely supported at its rear end by a link 325 pivoted to the key frame 33 by means of a screw 326. At its forward end the plate 324 is loosely supported by a lever 327 pivoted on a screw 328. A spring 331 normally holds the plate 324 in the position shown, with a shoulder 332 on the lower edge of the plate against a pin 333 carried by the key frame. The slot 334 cooperating with the pin 51 on the "5" amount key 30 is vertical so that depression of the "5" key will not move the plate 324 from its normal position. The other slots in the plate are so formed that the plate may be shifted rearward from one to four steps from its normal position by selectively operating the higher price keys. This differential movement of the plate 324 sets devices for controlling the extent of the oscillatory movement of the shaft 322 and segment 321 previously mentioned.

The devices just referred to comprise a bell crank loosely mounted on the shaft 322 (Fig. 2) and having its upwardly extending arm 335 slotted to engage a stud 336 attached to the lever 327. The other arm 337 of the bell crank is also slotted to engage a stud 338 attached to a forwardly projecting ear formed on a plate 339 slidably supported by a stud 340 fastened to the bar 37 of the key frame 33 and a stub shaft 341 fastened to the right hand machine frame. It is clear that the differential movements imparted to the plate 324 by operations of the keys 30 will be transmitted to the sliding plate 339. In other words, the plate 339 will always be adjusted to a position corresponding to the value of the key 30 depressed when preparing the machine for operation.

Extending rearward from the sliding plate 339 is an ear carrying an antifriction roller 343 engaging a slot 344 in a beam 345. The upper end of the beam 345 is loosely connected by a link 346 to the upper end of an arm 347 fastened to the shaft 322. At its lower end the beam 345 is pivotally connected by means of a pin 348 to a pitman 349 mounted for endwise movement on the stub shaft 341 and the driving shaft 112. The pitman 349 carries an antifriction roller 350 projecting into a cam groove 351 (Fig. 22, Sheet 6) formed in the side of the disk 146. The cam groove 351 is so shaped that at the beginning of a rotation of the driving shaft 112 the pitman 349 is thrust forward and held in the forward position during approximately half of the rotation of the shaft, after which the pitman is restored to its original position. This movement of the pitman 349 gives the lower end of the beam 345 an invariable extent of movement, but the extent of movement of the upper end of the beam depends upon the position of the sliding plate 339 and the roller 343 carried thereby. For example, if the parts are all in the position shown and the beam 345 is rocked about the roller 343 by operation of the pitman 349 the movement of the upper end of the beam will be sufficient only to rock the shaft 322 one step, but if the 25¢ key is depressed its pin 51 will shift the plate 324 rearward four steps and thereby lower the plate 339 to carry its fulcrum roller 343 down in the slot 344 to a position where subsequent operation of the pitman 349 will cause the upper end of the beam 345 to travel far enough to rock the shaft 322 five steps. The manner in which the movements of the rock shaft 322 and segment 321 in one direction are imparted to the change controlling shaft 312 will be described later on.

When the pitman 349 is thrust forward to rock the beam 345 and shaft 322 it locks the sliding plate 339 in position until shortly after the return movement of the pitman begins. For this purpose the pitman 349 has formed on its lower edge an arm carrying a laterally projecting blade 356. Formed in the rear edge of the sliding plate 339 are notches 357 spaced apart in such a way that one of the notches is opposite the blade 356 in each of the five positions of the plate 339. When the pitman 349 is thrust forward by operation of the driving shaft 112 the blade 356 will be held firmly in engagement with one of the notches 357 thereby holding the plate 339 and all of the connected parts in correct relationship.

The amount tendered keys 310 (Figs. 12 and 13) are mounted for endwise movement only in a frame 313, the construction being the same as previously described in connection with the price keys 30 and numbered keys 31. At the left of the bank of amount tendered keys is a plate 361 (Fig. 13) loosely supported at its forward end by a bell crank 362 pivoted at 363 to the key frame 313. At its rear end the plate 361 is loosely supported by a lever 364 pivoted on a pin 365 attached to the key frame. Projecting from the left hand sides of the keys 310 are pins 366 and for each of these pins the plate 361 has a slot 367 inclined for the greater part of its length and terminating at its lower end in a horizontal portion 368. When a key 310 is depressed its pin 366 will act against the inclined portion of the slot 367 to force the plate 361 rearward against the tension of a spring 369 until the pin reaches the bottom of the slot, whereupon the spring will return the plate 361 slightly toward its original position. This engages the horizontal portion 368 of the slot with the pin 366 on the key and latches the key in depressed position.

Near the end of the rotation of the driving shaft 112 the plate 361 is moved rearward far enough to disengage the portion 368 of the slot 367 from the pin 366 to permit the key 310 to be returned to its undepressed position. For this purpose the lower end of the lever 364 is suitably shaped to co-operate with a stud 371 carried by a lever 372 loose on the rock shaft 74. Mounted on the side of the lever 372 is an antifriction roller 373 engaging a cam groove 374 in the side of a disk 375 secured to the driving shaft 112. The cam groove 374 is so shaped that it holds the lever 372 stationary until near the end of the rotation of the shaft 112 and then rocks the lever 372 forward far enough to operate the lever 364 and plate 361 to release the depressed key.

From the foregoing it is clear that the detent plate 361 will release the depressed key 310 at the end of the first rotation of the driving shaft 112. As will appear later, however, the mechanism controlled by the keys 310 is such that in operations to issue more than one ticket the depressed key 310 must be retained in depressed position until near the end of the last rotation of the shaft 112. This is accomplished by a detent plate 376 (Figs. 13 and 17) loosely supported at its forward end by an arm 377 pivoted on the stud 363 and supported at its rear end by a bell crank 378 pivoted on the stud 365. Pivoted to the bell crank 378 is a link 379 having a slot 358 surrounding a stud attached to an arm 359 fastened to the rock shaft 74. In the normal position of the rock shaft 74 the arm 359, link 379 and bell crank 378 hold the detent plate in the position shown, but when the shaft 74 is released and rocked as previously described the arm 359 will be swung clockwise (Fig. 13) whereupon a spring 360 will draw the plate 376 forward to engage one of the hooks 380 on the plate with the pin 366 on the depressed key. The hook will be held in engagement with the key pin until near the end of the last step of movement of the shaft 74 when the shaft is being restored. During this last step of movement the stud on the arm 359 will operate through the other connections described to draw the plate 376 rearward against the tension of the spring 360 to disengage the hook 380 from the key pin 366 at about the same time that the cam groove 374 moves the detent plate 361 to releasing position. The key 310 is then free to be returned to undepressed position by the usual spring.

The amount tendered keys 310 perform two functions. They disable mechanism which normally prevents operation of the coin ejectors and they also control mechanism for entering in the change computing mechanism the amount of the coin or bill tendered in payment for tickets. The mechanism last mentioned will next be described.

At the right of the amount tendered key bank is a bar 381 (Figs. 12 and 17) supported by studs 382 attached to the amount tendered key frame 313. Loosely mounted on the studs 382 are links 383. At their lower ends the links 383 carry studs 384 on which a bar 385 is loosely mounted. The bar 381 has upwardly extending ears 386 in which are mounted studs 387 (Fig. 12) forming pivots for arms 388. At their lower ends the arms 388 are provided with open slots 389 engaging studs 390 fastened to the side of the bar 385. The arms 388 are also provided with variably inclined slots surrounding pins 393 which project from the right hand sides of the amount tendered keys 310 into vertical slots 392 in the stationary bar 381. Mounted on the side of the bar 385 is a roller 394. The slots in the arms 388 are so arranged that by depressing different keys 310 the bar 385 and roller 394 may be moved to five different positions.

The position of the roller 394 determines the position to which the amount tendered part of the change computing mechanism is to be moved during subsequent operation of the machine. The devices whereby this is effected comprise an element 397 (Figs. 12 and 17) and a plate 398 rigid with the element 397. A plate 399 serves to space the element 397 and plate 398 apart as shown in the figure last mentioned.

The plate 398 is provided with cam opening 401 (Fig. 12) surrounding an antifriction roller 402 on the upper arm of a lever 403 pivoted at 404 to a bar 405 supported by studs 406 attached to the right hand machine frame. At its lower end the lever 403 is provided with a segmental rack 407, the teeth of which are at all times in mesh with a gear 408 rotatable about the shaft 312 and forming a part of the planetary gear devices of the change computing mechanism. The element 397 is provided at its upper end with an opening which is not shown but is exactly the same in size and shape and coincides with the opening 401 in the plate 398 as viewed in Fig. 12. The lower end of the element 397 is loosely connected at 410 to an arm 411 pivotally mounted on a stationary stud 412. On the side of the arm 411 is an anti-friction roller 413. A spring 414 stretched between the lever 411 and the bar 405 at all times holds the roller 413 against the edge of a cam 415 (Figs. 17 and 20) fastened to the driving shaft 112. The shape of the cam 415 is such that when the driving shaft 112 begins to turn the arm 411 will be rocked counter clockwise (Figs. 12 and 20) against the tension of the spring 414, thereby drawing the element 397 and plate 398 rigid therewith down until the portion 421 of the opening 401 in the plate 398 is in engagement with the roller 402 on the segment arm 403. As this occurs the roller 394 will be engaged by the upper part of the opening (not shown) in the element 397, it being remembered that this opening (not shown) is exactly the same in size and appearance as the opening 401 in the plate 398. The sides of the opening 401 in the plate 398 and of the corresponding opening in the element 397 are so shaped that as the element and plate are drawn down as just described, the upper end of the element and plate will be swung about the pivot 410 to a position determined by the position at which the bar 385 and roller 394 are held by the depressed amount tendered key 310 and as the upper part 421 of the opening 401 comes into engagement with the roller 402 at the upper end of the segment arm 403 the arm will be moved to a position with its roller 402 in alignment with the roller 394. This will result in the segment arm 403 being swung to a position representing the amount tendered key operated. The cam 415 holds the segment arm in this position until near the end of the rotation of the shaft 112 and then allows the spring 414 to return the arm 411, element 397 and plate 398 to the positions in which they are shown in Fig. 12. As they return to said positions the portion 421 of the opening 401 in the plate 398 is disengaged from the roller 402 on the segment lever 403 so that the segment is left in adjusted position. If a different amount tendered key 310 is operated at the beginning of the next operation the segment lever 403 will be moved from the position in which it was left at the end of the preceding operation directly to the new position. In other words, the construction is such that the segment lever 403 and the amount tendered mechanism driven thereby may be moved directly from one position to another by successive operations with different amount tendered key depressed.

The gear 408 meshing with the segment teeth 407 on the segment lever 403 is rigid with a disk 423 (Figs. 12, 17, 23 and 24) and is, therefore, rotatable about the shaft 312 (see also Fig. 15) carrying the change ejector controlling disks 314 to 320 inclusive. Formed in the periphery of the disk 423 are aligning notches 424 (Figs. 12 and 24) to be engaged by the nose 425 (Figs. 12 and 21) of an aligning arm 426 loosely mounted on a rock shaft 427. Pivoted to the aligning arm 426 is a pitman 428 slotted to engage the driving shaft 112 and carrying an antifriction roller 429 projecting into a cam slot 430 in the side of a disk 431 fastened to the driving shaft. The shape of the cam groove 430 is such that after the cam 415 (Fig. 20) has drawn the element 397 (Figs. 12 and 17) and plate 398 down to rock the segment lever 403 and thereby position the gear 408 and disk 423 the locking arm will be swung upward to engage its nose 425 with the notches 424. The aligning arm is held in engagement with said notches during nearly one-half of the rotation of the driving shaft 112 thereby preventing any movement of the disk 423. The position of the disk 423, on account of the planetary gearing mechanism, before referred to and described fully later on, controls the positioning of the shaft 312 to represent the amount tendered.

The amount of sale, as previously indicated, is imparted to the change controlling shaft 312 by the oscillatory segment 321. The mechanism whereby said segment may be caused to oscillate different extents has already been explained. The devices whereby movement of the segment in one direction is transmitted to the shaft 312 will next be described.

Meshing with the teeth of the segment 321 is a gear 436 (Figs. 14 and 17) loosely mounted on the shaft 312. Adjacent the gear 436 is a companion gear 437 also loosely mounted on the shaft 312. The gears 436 and 437 are normally coupled together by a broad toothed pinion 438 loosely mounted on a stud 439 carried by a lever 440 journalled on the rod 427. Pivoted to the lower end of the lever 440 is one end of a pitman 441 (see also Fig. 25) the other end of the pitman being slidably supported by the driving shaft 112. Mounted on the side of the pitman 441 is an anti friction roller 442 engaging a cam groove 443 in the side of a disk 444 fastened to the driving shaft 112. The cam groove 443 is so shaped that the broad toothed pinion 438 remains in engagement while the segment 321 is being swung in the counter clockwise direction (Fig. 14) by the rocking movement imparted to the shaft 322 by the mechanism shown in Fig. 2 and previously described in detail. Just before the segment starts its clockwise movement (Fig. 14) that is, its movement back to its starting point, the cam groove 443 draws the pitman 441 rearward, thereby swinging the broad toothed pinion 438 out of engagement with the gears 436 and 437 so that the back to normal movement of the segment 321 and gear 436 does not affect the position of the gear 437.

Rigid with the gear 437 is a sleeve 448 (Figs. 14 and 17) having a reduced portion 449 to which is fastened a gear 450 (Figs. 23 and 24). Meshing with the gear 450 is a gear 451 (see also Fig. 17) rotatably mounted on a stud 452 attached to the disk 423 previously mentioned. Rigid with the gear 451 is a gear 453 meshing with a gear 454 journalled on a stud 455 fastened to the disk 423, the gear 454 in turn meshing with a gear 456, the hub 457 (Fig. 12) of which forms a bearing for the gear 408 and disk 423 and is fastened to the shaft 312 carrying the change controlling disks. A spacing disk 461 fastened between the gears 451 and 453 serves to hold all of the gears just mentioned in proper operating relationship.

From the foregoing it is clear that when the segment 321 is swung counter clockwise (Fig. 14) the movement will be transmitted through the gear 436 (Fig. 17) broad tooth pinion 438, gear 437, sleeve 448 and the gears 450, 451, 453, 454 and 456 (Figs. 23 and 24) to the shaft 312 with the result that said shaft will be turned in a counter clockwise direction (Fig. 24) to an extent depending upon which price key 30 was depressed at the beginning of the operation. While this movement is being imparted to the shaft 312 by the segment 321 the disk 423 is also being turned in one direction or the other by the segment 407 to an extent depending upon which of the amount tendered keys 310 was depressed. As the disk 423 is turned the gear 451 on account of being rotatably mounted on the disk, will rotate around the gear 450, thereby causing the gears 453 and 454 to turn the gear 456 and shaft 312, the result of the movement of the two segments 407 and 321 being to set the shaft 312 at a position representing the difference between the amount tendered and the price of the ticket sold.

For example, if a ten cent ticket is called for and a twenty-five cent piece is tendered in payment, the ten cent price key 30 and the twenty-five cent amount tendered key 310 are operated. In Fig. 12 the mechanism controlled by the amount tendered keys 310 is shown in the position at which it would be left by an operation of the ten cent key 310. The slot 461 in the arm 388 for the 25¢ key is so shaped that when the 25¢ key is depressed its pin 393 will swing the lower end of the arm 388 to the right (Fig. 12) thereby carrying the bar 385 and roller 394 thereon to the right three steps from the position shown. Then when the lever 411 is operated by the cam 415 (Fig. 20) as previously described, the roller 394 will cause the upper end of the element 397 and plate 398 to be shifted to the right with the result that the opening 401 in the plate 398 will engage the roller 402 of the segment lever 403 and move the upper end of the lever to the right (Fig. 12). This will cause the segment 407 to be swung to the left causing the gear 408 and disk 423 to turn counter clockwise (Fig. 12) or clockwise (Fig. 24) from the ten cent position shown to the twenty-five cent position. As the disk 423 turns, the gear 451 mounted thereon, will be rotated about the gear 450, causing the gears 453 and 454 to turn the gear 456 and shaft 312 counter clockwise (Fig. 24) or clockwise (Fig. 12) three steps or to a position representing 25¢. At the same time the segment 321 (Fig. 11) will be oscillated two steps to represent the ten cent key and this movement will be transmitted through the connections previously described to the gear 456 and shaft 312, causing the shaft to turn two steps counter clockwise (Fig. 12) or clockwise (Fig. 24) the net result of the two movements being to leave the shaft at the 15¢ position.

The slot 462 (Fig. 12) in the arm 388 for the 50¢ key is so shaped that it will cause the segment 407 to drive the shaft 312 from the position shown in the same direction as just described in connection with the 25¢ key but will cause the segment to move 5 steps farther than the 25¢ key so that if a ten cent ticket is sold and a 50¢ piece tendered in payment the net result of the movement of the segments 407 and 321 will be to set the shaft 312 at the forty cent position. The slots 463 and 464 in the arms 388 for the 75¢ and $1 amount tendered keys respectively are inclined in the opposite direction from the slots 461 and 462 for the 25¢ and 50¢ keys. If the parts are in the position shown in Fig. 12, that is, the position in which they would be left by an operation involving the ten cent amount tendered key, and the one dollar key is depressed the pin 393 of the dollar key will cooperate with the slot 464 in the dollar arm 388 to move the bar 385 and roller 402 two steps to a central position which, in the construction shown, is also the one dollar position. If, after pressing the one dollar key, the 75¢ key is depressed the bar 385 and roller 394 will be carried five steps farther to the left from the dollar to the 75¢ position. Assuming that the shaft 312 was adjusted during the preceding operation according to the one dollar key, operation of the machine under control of the 75¢ key will cause the shaft to turn 5 steps clockwise (Fig. 12) or counter clockwise (Fig. 24) to the 75¢ position while operation of the segment 321 to enter the price of a ten cent ticket will cause further movement of the shaft 312 in the same direction with the result that the shaft 312 will be set at the 65¢ position.

As previously explained, after the disk 423 is set to represent the amount tendered key operated it is locked in position by the aligning arm 426. For the purpose of holding the planetary gear mechanism driven by the segment 321 in position there is provided a lever 471 (Figs. 14 and 17) loosely mounted on the shaft 427, a spring 472 being tensioned in such a way as to hold the rear end of the lever in contact with the teeth of the gear 437, thereby holding the gear 437, and the change mechanism connected thereto in the position to which it was driven by the segment 321 when the broad tooth pinion 438 is withdrawn from engagement and the segment 321 swung back to its starting point. In order to lock the shaft 312 in set position while the coin ejecting mechanism controlled by the disks on the shaft is being operated, there is fastened to the shaft, a disk 474 (Figs. 12 and 17) provided with notches 475 to be engaged by the nose of an aligning or locking arm 477 loosely mounted on the rod 427. Pivoted to the arm 477 is one end of a pitman 478 the other end of which is slotted to engage the driving shaft 112 and carries an anti friction roller 479 engaging a cam slot 480 in the side of a disk 473 fastened to the driving shaft. The shape of the cam slot 480 is such that after the segments 321 and 407 have been operated to set the shaft 312 the pitman 478 is drawn rearward and the locking arm 477 engaged with the teeth 475 in the disk 474. The locking arm 477 remains in engagement and prevents any movement of the shaft 312 until sufficient time has elapsed for the ejector controlling disks carried by the shaft to perform this function.

As previously pointed out, the construction of the mechanism controlled by the bank of amount tendered keys 310 (Fig. 12) is such that the segment 407 is moved from the position at which it was left by the preceding operation directly to the new position. The mechanism operated by the segment 321 (Fig. 14) is, however, returned to its starting point at the end of each operation. With this end in view, fastened to the sleeve 448 is a heart shaped cam 481 (Figs. 14 and 17). Cooperating with this heart shaped cam is an arm 482 loosely mounted on a rod 483 and normally held by a spring 484 against a stop 485. At its upper end the arm 482 carries a roller 486 to engage the periphery of the heart shaped cam 481. Projecting from the arm 482 is a stud 487 normally engaged by a notch 488 in the lower forward end of a pitman 489. This pitman is slidably mounted on the driving shaft 112 and carries an antifriction roller 490 engaging a cam groove 491 in the side of a disk 492 secured to the shaft 112. The construction is such that after the locking arm 477 (Fig. 12) is disengaged from the locking disk 474 fastened to the shaft 312, the pitman 489 will be thrust forward, thereby swinging the arm 482 to carry the roller 486 against the periphery of the heart shaped cam 481 with the result that the cam and the sleeve 448 to which it is attached will be turned in one direction or the other to its starting point, the direction depending upon what part of the periphery of the cam the roller 486 first engages. At the end of the forward thrust of the pitman 489 the roller 486 will be held in engagement with the notch 493 in the heart shaped cam 481.

Up to this point the explanation of the construction and operation of the change computing mechanism has been limited to computing the change when a single ticket is sold. However, when one of the number keys 31 is employed the pitman 489 (Fig. 14) is disconnected from the arm 482 and is held disconnected until just before the last rotation of the shaft 112 begins so that the arms 482 is not operated to actuate the heart shaped cam 481 until the last ticket of the series is issued. As each of the tickets of the series is issued the segment 321 is oscillated with the result that the mechanism driven by the segment is advanced at each operation of the segment an extent corresponding to the value of the ticket thereby accumulating in the change computing mechanism the total value of the tickets called for by the number key operated. Just before the rotation of the driving shaft 112 to issue the last ticket and eject the computed change is begun the pitman 489 is reconnected to the arm 482 so that near the end of the last rotation of the shaft the heart shaped cam 481 will be engaged to turn the sleeve 448 and parts connected thereto to their starting point.

In operations such as just described, the connection between the pitman 489 and arm 482 is controlled by the rock shaft 74 (Figs. 6, 14 and 17). Attached to the rock shaft 74 is an arm 501 and pivoted to an upwardly extending arm 502 of the pitman 489 is a pawl 503 held by a spring 504 in engagement with a stop pin 505 on the side of the pitman. The arm 501 is so positioned on the rock shaft 74 that when the shaft 74 is permitted to rock one division, that is, until the step 86 (Fig. 6) engages the arresting tooth 87 of the bell crank 89, the arm 501 will not quite engage the pawl 503. It will be remembered that the shaft 74 has this single step of movement when a price key 30 only is depressed. If one of the number keys 31 is depressed to rock the bell crank 89 so as to permit the shaft 74 to rock more than one step the arm 501 will engage the pawl 503 and rock it counter clockwise (Fig. 14) against the tension of the spring 504. The spring 504 may then contract drawing the pawl 503 against its stop 505 and causing the end of the pawl 503 to cooperate with the upper end 507 of the arm 501 to raise the forward end of the pitman 489 to disengage its notch 488 from the stud 487 on the arm 482. In order to make the operation certain in all cases, however, reliance is not placed solely upon the spring 504 for lifting the pitman to disconnect it from the arm 482, but means is provided for positively raising the pitman 489 far enough for the spring 504 to return the pawl 503 into engagement with its stop 505 if the spring alone has not already accomplished that result.

The means for positively lifting the pitman includes an arm 511 (Figs. 14 and 17) loose on the shaft 115 and slotted at its forward end to engage a stud 512 on the arm 502 extending upward from the pitman 489. Attached to the side of the arm 511 is a stud 513 normally in engagement with an inclined portion 514 of a cam plate 515 fastened to the side of the disk 492. Rigid with the arm 511 is an arm 516 to which is fastened one end of a spring 517. As soon as the disk 492 begins to turn the inclined portion 514 of the cam plate 515 will raise the arm 511 and pitman 489 against the tension of the spring 517 far enough to disengage the notch 488 in the pitman from the stud 487 on the arm 482. This will also permit the spring 504 to swing the pawl 503 back into engagement with its stop 505. Then when the cam plate passes out of engagement with the roller 513 the end of the pawl 503 will engage the end 507 of the arm 501 and support the pitman 489 in elevated or disconnected position.

The arm 501 and pawl 503 will cooperate to hold the pitman 489 in elevated or disconnected position while the shaft 74 is being restored step by step by rotations of the driving shaft 112 as previously described until just before the last rotation and step of restoring movement begins. Just before this last step of movement begins the arm 501 will be carried clear of the pawl 502 at which time the pitman 489 will be held in its forward position by the cam race 491. As soon as the arm 501 clears the pawl 503 the spring 517 will rock the arms 516, 511 and pitman 489 clockwise (Fig. 14) to engage the portion 519 of the lower edge of the pitman 489 with the stud 487. Then as the pitman 489 is drawn rearward to the position shown the spring 517 will cause the notch 488 in the pitman 489 to reengage the stud 487 and near the end of the final rotation of the driving shaft 112 the arm 482 will be swung forward to engage the heart shaped cam 481 to set the ticket sale part of the change computing mechanism to its starting point.

As before stated, it may happen that a patron calls for two or more tickets of different prices and in such cases the change is not ejected until all of the tickets have been issued and their total value entered in the change computing mechanism. This result is effected by operating the two price key 311 (Figs. 1, 14 and 17) mounted in a key frame 525. When this key is operated it disconnects the pitman 489 from the arm 482 and holds it disconnected until all of the tickets of the first price have been issued. In other words the machine completes the issue of the series of tickets of one price without operating the arm 482 to destroy the amount entered in the change computing mechanism. Then when the machine is operated again to issue the tickets of the other price the value of the second series tickets is added to that already entered in the change computing mechanism and as the last ticket of the second series or price is issued the change is ejected and the arm 482 operated to set the heart shaped cam 481 at its starting point.

The connections whereby operation of the two price key 311 disconnects the pitman 489 from the lever 482 include a stud 521 (Figs. 14 and 17) attached to the side of the key. This stud is substantially square in cross section, being rounded at one corner only to engage an inclined portion 522 of a plate 523. This plate is loosely supported at its forward end by a lever 524 pivoted on the stud 363 on the key frame 313. At its rear end the plate 523 is loosely supported by a lever 526 pivoted on the stud 365 on the key frame 313. A spring 528 stretched between the lower end of the lever 524 and an arm 529 on a plate 530 holds the inclined edge 522 of the plate 523 in contact with the stud 521. Formed on the lower edge of the plate 523 is an extension 532 carrying a stud 533 engaging the upper end of the arm 516. When the key 311 is depressed its stud 521 will cam the plate 523 rearward against the tension of the spring 528 until the stud is carried past a shoulder 534 on the plate whereupon the spring 528 will return the plate 523 slightly toward its normal position so as to carry the shoulder 534 above the stud 521 and thereby latch the key 311 in depressed position. As the plate 523 is cammed rearward by depression of the key 311 the stud 533 will rock the arms 516 and 511 and raise the pitman 489 far enough to disconnect it from the arm 482. Near the end of each rotation of the shaft 112 the plate 523 is moved rearward far enough to disengage the shoulder 534 from the stud 521, so that if nothing else prevents the key will be returned to undepressed position by the usual key spring.

The plate 523 is moved rearward to release the key 311 by a stud 537 (Figs. 14 and 17) attached to the cam disk 375 striking an arm 538 of a bell crank loosely mounted on the shaft 115. The other arm 539 of the bell crank is slotted to engage a stud 540 carried by the lever 526. By tracing the connections through it will be seen that when the plate 523 is cammed rearward by operation of the key 311 the arm 538 will be swung clockwise (Fig. 14) but this movement will not be sufficient to carry the arm entirely out of the path of the stud 537 and as the shaft 112 nears the end of its rotation the stud 537 will engage the arm 538 and move the plate 523 rearward to release the key. This occurs after the pitman 489 has been thrust forward its full distance while disconnected from the arm 482 and as the pitman returns to its normal position its notch 488 will be reengaged with the stud 487 ready to operate the arm 482 and set the heart shaped cam 481 at its starting point at the next rotation of the shaft 112. It is clear that in order to prevent disturbing the cam 481 additional means must be provided for holding the pitman disconnected until all of the first series of tickets are issued. This is accomplished by providing devices for latching the key 311 in depressed position until the driving shaft 112 has almost completed its final rotation. These devices include the plate 530 previously mentioned. This plate is loosely supported at its forward end by an arm 543 journalled on the pivot 363. At its rear end the plate is supported by the arm 544 of a bell crank mounted on the pivot 365, the other arm 545 of the bell crank being pivoted to the upper end of a link 546. At its lower end the link 546 is provided with a slot 547 surrounding a stud 548 on an arm 549 fastened to the rock shaft 74. In the normal position of the rock shaft 74 the plate 530 is held in the position shown against the tension of the spring 528 but as soon as the shaft 74 rocks one or more steps the arm 549 will be swung upward whereupon the spring 528 will move the plate 530 forward to carry a shoulder 550 on said plate above the stud 521 on the key 311. The shoulder 550 will remain in engagement with the stud 521 while the rock shaft 74 is being restored until just as the last step of restoring movement of the rock shaft 74 is being completed the arm 549 and link 546 will draw the plate 530 rearward to disengage the shoulder 550 from the stud 521. As the shoulder 550 passes out of engagement with the stud 521 the stud 537 will engage the arm 538 and rock the lever 526 to draw the other latching plate 523 rearward far enough to disengage its shoulder 534 from the stud 521. The key 311 will then be restored to its undepressed position by its key spring, thereby allowing the pitman 489 to drop down to a position where, as it is drawn back to the position shown by the cam groove 491, the notch 488 will be reengaged with the stud 487.

From the foregoing it is clear that when the two price key 311 is depressed and the machine operated to issue one or more tickets the pitman 489 is prevented from actuating the arm 482 and as a result when the machine comes to rest at the end of the operation to issue the first series of tickets the heart shaped cam 481 and devices operatively connected thereto will be left in the position to which they have been driven by oscillations of the segment 321 so that the cam and its connections will remain set to represent the total value of the first series of tickets issued.

When the machine is operated to issue the second series of tickets the two price key 311 is not operated but the pitman 489 is controlled by the number keys 31 and arm 501 as previously explained, so that the value of the second series of tickets is added to the value previously entered in the change computing mechanism while issuing the first series of tickets. At the end of the operation to issue the next to the last ticket of the second series the pitman 489 is reconnected to the arm 482 so that during the operation to issue the last ticket and after the change has been ejected the arm 482 will be operated to set the amount or ticket sale side of the change computing mechanism to its starting point.

*Change ejecting mechanism.*

The coins from which change is made are carried in seven holders designated by the numerals 551 to 557 inclusive (Fig. 1). The denominations of the coins in the different holders will be referred to particularly later. The holders are all fastened to cross bars 559 and 560 (Figs. 18 and 19A). At their right ends the bars 559 and 560 are fastened by means of thumb screws 561 to laterally extending portions of arms 563 and 564 projecting upward from a frame plate 565 (see also Fig. 19B). At their left ends the bars 559 and 560 are similarly supported by arms which are not shown in the drawings but are like the arms 563 and 564 and are formed on the left side frame of the machine. The construction is such that the entire set of coin holders may be removed as a unit at the close of business or at any other time desired by simply removing the thumb screws.

Rigid with the cross bar 560 are arms 566 connected by a cross bar 567 suitably inclined to direct coins into the receptacle 239 where they can be removed by the ticket purchasers. A strip 562 across the coin holders prevents an incorrect number of coins from being accidently ejected. The arms 563 and 564 are so proportioned that they hold the set of coin trays at an angle, as best shown in Fig. 19A, so that as coins are ejected from the bottoms of the holders the coin stacks will drop to bring other coins in the paths of the ejectors 569.

The coin ejectors 569 are in the form of slender bars pivoted at 570 (Figs. 18, 19A and 19B) to arms 571 of bell cranks 572 loosely mounted on a rod 573. Springs 574 hold the upper ends of the coin ejectors in contact with adjusting screws 576 (Figs. 18 and 19A) in the cross bar 560. These adjusting screws are to be turned until the upper ends of the coin ejectors will engage one or more coins as desired, after which the adjusting screws are locked against displacement by means of lock screws 578. The springs 574 also normally hold the coin ejectors 569 in retracted position, that is with portions 581 of the arms 571, in contact with a stationary rod 582.

The ejectors are operated by elements 583 pivoted at 584 to the rear ends of arms 585 fastened to a rock shaft 586. Springs 587 stretched between the upper ends of the elements 583 and the arms 585 hold the elements 583 with inclined portions 588 thereof in contact with the rod 582. At their lower ends the elements 583 work in slots 589 and 590 formed in a yoke 593 attached to the rod 582 and a second stationary rod 592. The slots 589 not only guide the elements 583, but they also guide the lower ends of the coin ejectors 569 and devices described later on, co-operating with the elements 583. The shaft 586 is rocked at each operation far enough for the arms 585 fastened thereto to lower the elements 583 from the position in which they are shown to a point where shoulders 594 on the elements will, if not prevented, engage the lower ends 595 of the coin ejectors 569 so that when the shaft 586 is rocked back to its original position the ejectors 569 so engaged will be thrust upward to eject coins. Engagement of the shoulders 594 with the ends 595 of the coin ejectors is controlled by the shaft 312 and the ejector controlling disks 314 to 320 inclusive fastened to said shaft.

The mechanism for rocking the shaft 586 comprises a pitman 596 (Figs. 19B and 27) slotted to surround a shaft 597 connected by gears 113, 5961 and 5971 (Fig. 2) to the main driving shaft 112. Upon each rotation of the shaft 112 the shaft 597 will also make a complete rotation. The pitman 596 has oppositely extending rollers 598 and 599 cooperating respectively with cams 600 and 601 fastened to the shaft 597. (See also Fig. 18). At its upper end the pitman 596 is pivoted to one end of a lever 605 rigid with the rock shaft 586. Fastened to the other end of the lever 605 is one end of a spring 606, the other end of the spring being held by a screw 607 in the frame plate 565. The spring 606 is at all times under tension and holds the pitman 596 with its roller 598 in contact with the periphery of the cam 600.

Rigid with the shaft 586 is also an arm 611 connected by a link 612 to the plunger 613 of a dash pot designated generally by the numeral 614. This dash pot is of the usual type and need not be explained in detail here, it being sufficient for the present purpose to state that the dash pot valve may be adjusted by means of the knob 615 to regulate the time required for the dash pot to operate. When the shaft 597 begins to turn in the direction of the arrow (Figs. 19B and 27) the cam 600 will act against the roller 598 to draw the pitman 596 down, thereby rocking the shaft 586 against the tension of the spring 606 and springs 574 to lower the coin ejector operating elements 583 to a position where their shoulders 594, can, if the controlling shaft 312 is properly set, engage the lower ends of the ejectors 569. This movement of the shaft 586 raises the dash pot plunger 613, this upward movement of the plunger being the idle one. At the same time the tension of the spring 606 and springs 574 is increased. Shortly after the pitman 596 has been drawn down the full distance the cam 601 will engage the roller 599 and start the pitman 596 back towards its original position. This preliminary movement is permitted by the dash pot 614. The return movement of the pitman 596 is completed by the spring 606 against the action of the dash pot, the purpose of this spring and dash pot construction being, of course, to give a uniform operation of the change ejector operating elements 583 regardless of the speed at which the machine is operated.

In the normal condition of the parts the elements 621 of bell cranks 622 are held in such position that when the elements 583 are lowered, as previously described, the inclined portions 623 of the elements will engage the upper ends of the arms 621 of the bell cranks so that these portions and the lower inclined edges of the shoulders 594 will cam the lower ends of the elements 583 forward against the tension of the springs 587. At the end of the downward movement of the elements 583 the shoulders 594 will rest against the forward edges 619 of the arms 621 of the bell cranks.

When one of the change keys 310 is depressed all of the bell cranks 622 will be released during the subsequent operation of the machine and the springs 587 acting through the elements 583 will rock the bell cranks until shoulders 620 on the arms 621 of the bell cranks will either enter the cutaway portions 624 (Figs. 16 and 19$^B$) of the change controlling disks on the shaft 312 or will be stopped by the peripheries 625 of the disks depending upon the position to which the shaft 312 has been turned by the change computing devices previously described. When the arms 621 are stopped by the peripheries 625 of the disks they will still prevent the shoulders 594 of the elements 583 from engaging the lower ends 595 of the coin ejectors. Where the shoulders 620 enter the cut-away portions 624 of the disks, however, the arms 621 will no longer interfere with the engaging movement of the elements 583 and the spring 587 will then swing the elements 583 about their pivots 584 to carry the shoulders 594 under the lower ends 595 of the ejectors 569. The portion 629 (Fig. 27) of the cam 601 will then quickly raise the pitman 596, thereby rocking the shaft 586 and raising the arms 585 and elements 583 far enough for the shoulders 594 to clear the upper ends of the bell crank arms 621 and permit the bell cranks to be restored to normal position without disconnecting the elements 583 from the ejectors 569 which are to be operated. The spring 606 then completes the movement of the shaft 586 and arms 585 to the starting point. As the parts near this starting position the inclined portions 588 of the elements 583 will cooperate with the rod 582 to disengage the shoulders 594 from the ejectors 569, whereupon the springs 574 will return the ejectors to the position shown.

The devices preventing movement of the bell cranks 622 unless one of the amount tendered keys 310 has been operated includes arms 631 (Figs. 15 and 19$^B$). There is one of these arms 631 for each bell crank 622. The arms 631 are all fastened to a rock shaft 633 and carry studs 634 engaging the rear edges of the arms 621 of the bell cranks and normally holding the bell cranks with their arms 632 resting against collars 630 (Figs. 15 and 18) or the hubs of other devices more fully referred to later on, these hubs or collars all being fastened to a shaft 640. Secured to the shaft 633 is an arm 635 (Figs. 19$^B$ and 26) carrying an anti friction roller 636. Fastened to the shaft 633 is also an arm 637 (Figs. 13 and 19$^B$) to which is fastened one end of a spring 638. The spring 638 is constantly under tension and holds the shaft 633 and arm 635 in the position shown with the roller 636 resting against the periphery of a cam 641 fastened to the shaft 597. At its rear end the arm 637 carries a stud 642 normally engaging a notch in the upper end of an extension 643 (Fig. 13) of an arm 644 loosely mounted on the rock shaft 74. At is forward end the arm 644 is slotted to engage a stud 645 carried by an arm 646 fastened to the rock shaft 427. Attached to the rock shaft 427 is also an arm 648 connected by a link 649 to an arm 650 of the bell crank 362 (see also Fig. 17) supporting the latching plate 361 for the amount tendered keys 310. When an amount tendered key 310 is depressed and the plate 361 moved rearwardly as previously described the link 649 will be raised and will swing the arm 646 counter clockwise (Fig. 13) and the arm 644 clockwise to disengage the notch in the extension 643 from the stud 642. The arm 637 and rock shaft 633 will, however, be prevented from rocking because of the engagement of the roller 636 with the cam 641; but when the shaft 597 has been turned far enough to bring the cut-away portion 653 (Fig. 26) of the cam 641 in position to cooperate with the roller 636, the spring 638 (Figs. 13 and 19$^B$) will rock the shaft 633 to swing the arms 631 counter clockwise (Fig. 19$^B$) and carry their studs 634 out of engagement with the arms 621 of the bell cranks 622 so that the bell cranks will be free to rock to engage their shoulders 620 with the peripheries 625 of the ejector controlling disks on the shaft 312 or carry said shoulders into engagement with the cutaway portions 624 of the disks associated with the coin ejectors which are to be operated. The elements 583 are then raised, as previously described, and the ones which have been permitted to engage their coin ejectors 569 will operate the ejectors to eject the proper coins.

Near the end of the rotation of the driving shaft 112 the latching plate 361 (Fig. 13) is operated by the arm 372 (Fig. 13) to release the key and the key is restored to undepressed position by its spring. By this time the cam 641 will have swung the shaft 633 and arm 637 back to the first position so that when the latching plate is restored to its original position the arm 644 will be swung back to the point where the notch in its extension 643 will engage the stud 642 and hold the shaft 633 against movement during the succeeding operation unless one of the keys 310 is first depressed.

As so far described it is apparent that each time an amount tendered key 310 is depressed and the machine is operated the arm 637 will be released and drawn down by its spring 638 when the cut-away portion 653 (Fig. 26) of the cam 641 reaches the roller 631. This would permit the coin ejectors to be operated at each rotation of the shaft 597. This is what occurs when only single tickets are issued. It is clear, however, that when more than one ticket is issued the arm 637 (Fig. 13) should be held in its normal position so as to prevent operation of the coin ejectors until the last ticket is issued. This is accomplished by an arm 670 (Figs. 13 and 19$^B$) fastened to the rock shaft 74. When the rock shaft 74 is rocked a single step in an operation to issue a single ticket the arm 670 will be carried clockwise, as shown in the two figures mentioned. This movement will not be great enough to interfere with the movement of the arm 637 when the cam 641 (Fig. 26) releases the arm. If the rock shaft 74 is rocked two or more steps, however, the arm 670 will be carried under the portion 671 of the arm 637 so that even though the arm 637 is freed by the cam 641 movement of the arm 637 and shaft 633 is prevented until after the next to the last ticket has been issued. By the time the operation to issue the last ticket is begun the arm 670 on the rock shaft 74 will have been carried clear of the arm 637 so that at the proper point in the last operation the spring 638 will be permitted to rock the shaft 633 and thereby withdraw the pins 634 on the arms 631 from engagement with the bell cranks 622. As a result the ejectors 569 will then be operated to eject the change.

As previously stated, the coins from which change is made are carried in seven holders the relative positions of which are shown in Fig. 1. The holder 551 carries nickels and the ejector 569 cooperating therewith is arranged to eject a single coin at each operation of the ejector. The holder 557 also contains nickels but the ejector 569 therefor is so set that it ejects two coins at each operation. The holders 552 and 553 are for dimes and a single coin may be ejected from one or both of them, depending upon the nature of the change desired. The holder 554 contains twenty-five cent pieces and the ejector cooperating therewith is arranged to eject a single coin. The holder 556 also contains twenty-five cent pieces, and its coin ejector will eject two coins when operated. The purpose of the holder 557 is to permit issuing two five cent pieces when the coins have all been removed from the dime holder 553 while the holder 556 serves the same purpose with reference to the 50¢ holder 555. That is, when the supply of 50¢ pieces has been exhausted it becomes possible to adjust the machine so that at each subsequent operation when a 50¢ piece would ordinarily be ejected two twenty-five cent pieces will be ejected instead. The mechanism whereby the machine may be caused to eject two quarters instead of a half dollar will next be described.

Mounted on the shaft 640 (Figs. 15, 18 and 19$^B$) is a sleeve 676 (Figs. 15 and 19$^B$) to the left end of which is fastened an arm 677 which, when the parts are set to cause ejection of coins from the fifty cent tube, is in engagement with a curved portion 678 of an arm 679 rigid with the bell crank 622 cooperating with the ejector 569 for ejecting two twenty-five cent pieces from the coin holder 560. Fastened to the right hand end of the sleeve 676 is a bell crank 682 the arm 683 of which projects through a slot (not shown) in the front of the machine casing to permit the operator to shift it from one position to another. When changing the mechanism from the position shown to the position where two twenty-five cent pieces will be ejected the arm 683 is depressed thereby carrying the end of the arm 684 of the bell crank 682 into engagement with the arm 685 (Fig. 15) rigid with the bell crank 622 for the fifty cent coin holder. At the same time the arm 677 will be turned to a position where it will cooperate with a cut-away portion 687 (Fig. 19$^B$) in the arm 679 so that when the rock shaft 633 and arms 631 are rocked to release the bell cranks 622 the bell crank for the fifty cent coin holder will be locked against movement while the bell crank for the two twenty-five cent piece holder will be free to operate. It is clear that the ejector controlling disks 318 and 319 must be alike and that by shifting the arm 683 from one position to the other the machine may be caused to eject coins from either the holder 555 or holder 556, as desired.

The bell crank 682 is retained in either of its two positions by a plate 690 (Fig. 19$^B$) pivoted at 691 to the arm 684 of the bell crank 682 and having an opening 692 surrounding the shaft 640. Stretched between the upper end of the plate 690 and the lower plate of the yoke 593 is a spring 693. By referring to Figure 19$^B$ it will be clear that when the parts are set at the position where fifty cent pieces are to be issued the line between the pivot 691 and the upper end of the spring 693 passes to the right of the shaft 640. When the arm 683 of the bell crank 682 is depressed to change the controlling mechanism so that two twenty-five cent pieces will be issued the pivot point 691 will be swung clockwise (Fig. 19B) to a point where the line between the pivot 691 and the upper end of the spring 693 will pass to the left of the shaft 640. In either of these positions the bell crank 690 and the parts connected thereto will be stopped after they have passed over the dead center by the sides 697 of the opening 692 coming in engagement with the shaft 640.

The mechanism for changing the machine to eject two five cent pieces from the holder 557 instead of a dime from the dime holder 553 is substantially the same as just described. The bell crank 701 (Fig. 15) for shifting the mechanism is the same as the bell crank 682 associated with the holders 559 and 560 but is fastened to the rock shaft 640. The arm 702 (Fig. 15) which is like the arm 677 and cooperates with the bell crank 622 controlling the ejector for the holder 557 is also fastened to the shaft 640 so that when the bell crank 701 is operated the shaft and arm 702 will move as a unit therewith, the result being to lock the bell crank 622 for the dime holder 553 against movement and release the bell crank 622 associated with the ejector for the five cent holder 557. It is, of course, clear that the disks 316 and 320 are alike so that when the shaft 312 is set at a position calling for ten cents in change either a dime or two nickels may be ejected depending upon the position of the shaft 640.

By referring to Fig. 1 it will be apparent that there may be sales requiring ejection of change for which no provision is made in this particular machine. For example, three dimes might be tendered in payment for a twenty-five cent ticket. The present machine has no thirty cent amount tendered key. Other examples might be cited showing that it may occasionally be necessary to issue change in some other way than by means of the change making mechanism so far described. For this reason the machine is provided with a row of keys 710 (Figs. 1, 18, 19A and 19B) slidably mounted in a cross bar 711 (Figs. 18 and 19A) and having slots 712 (Fig. 19B) surrounding a rod 713 supported by arms 715 (Fig. 18) integral with the cross bar 711. At their lower ends the keys are suitably shaped to engage rollers 716 on arms 717 of the bell cranks 572. The other arms 571 of these bell cranks, it will be recalled, have pivoted thereto the coin ejectors 569. It is clear that change may be ejected from any of the coin holders by depressing the corresponding key 710 against the tension of its spring 725, thereby rocking the bell crank 572 clockwise (Fig. 19B) and thrusting the connected coin ejector 569 upward (see also 19A) to engage the coin or coins at the bottom of the coin holder and raise the coins up over the supporting plate 568 at the bottom of the holder far enough for the coins to drop into the receptacle 239. When the finger is removed from the key 710 the key spring 725 and spring 574 will return the key and coin ejector to normal position.

*Operation.*

From the above it is clear that when one or more tickets is called for and the exact amount is tendered in payment, the machine is to be operated by simply pressing the proper price key 30 or pressing the desired number key 31 and then the price key 30. This will cause the correct number of rotations of the driving shafts at each of which rotations a ticket is printed and issued. The change making mechanism will not be operated for, while the change controlling shaft 312 (Fig. 14) will be actuated by the amount segment 321 as each ticket is issued the mechanism shown in Fig. 13 will prevent movement of the rock shaft 633. As a result the arms 631 (Fig. 19B) attached to the shaft 633 will prevent operation of the change ejectors 569.

To operate the machine to issue a single ticket and eject change it is only necessary to press an amount tendered key 310 and a price key 30. Then when the machine is operated the price segment 321 (Fig. 14) will enter the value of the ticket on the change controlling shaft 312 while the segment 407 (Fig. 12) will also be actuated to transmit to the shaft 312 a movement corresponding to the amount tendered. For instance, if a 25¢ ticket is called for and a half dollar is presented in payment the operator will first depress the 50¢ amount tendered key 310 and then the 25¢ value key 30. Then when the machine is operated the segment 321 will be actuated to transmit five steps of movement in one direction through the planetary gearing to the change controlling shaft 312. At about the same time the pear shaped cams shown in Fig. 12 are drawn down and cooperate with the stud 394 positioned by the key and the stud 402 on the arm 403 of the segment 407 to adjust the segment 407 from the position at which it was left by the preceding operation directly to the 50¢ position. This movement of the segment is transmitted through the planetary gearing to the shaft 312 so that the shaft will be given ten steps of movement but in the direction opposite to the movement imparted to the shaft by the segment 321. As a result the shaft 312 will be left at the 25¢ position, in which position the controlling disk 316 (Fig. 16) will permit the associated twenty-five cent coin ejecting mechanism to operate. All of the other ejector controlling disks will at this time have some portion of their peripheries 625 opposite the shoulders 620 on the ejector controlling bell cranks 622 so that the rest of the change ejectors will be prevented from operating. At the end of the operation the pitman 489 (Fig. 14) operates the arm 482 to carry the stud 486 on the arm into engagement with the heart shaped cam 481 so that the cam and gearing connected thereto are turned to zero, this movement, of course, resulting in destroying the computation in the change computing mechanism and setting all of the amount of sale side of the change computing mechanism at zero.

When several tickets of the same price are to be issued and change ejected the operation is the same as just described, except that before the price key 30 is operated one of the number keys 31 must be depressed. When the number key is depressed the arm 501 (Fig. 14) on the rock shaft 74 passes under the pawl 503 and when the driving shaft 112 begins to turn the cam block 515 will raise the pitman 489 to disconnect the pitman from the setting arm 482. When the pitman is so disconnected its reciprocations will not affect the arm 482 so that all of the reciprocations of the pitman except the last one will be idle. Before the last reciprocation begins the arm 501 will be carried clear of the pawl 503 and the pitman 489 will then reengage the stud 487 on the arm 482 and at the end of the last operation of the shaft 112 the arm 482 will turn the amount of sale part of the change computing mechanism to zero.

To issue two different kinds of tickets and eject change the operator will press the proper amount tendered key 310, the two price key 311, the number key 31 corresponding to the number of tickets desired of the first series and then one of the price keys 30. The operation of the mechanism is the same as described in the preceding paragraph except that the two price key 311 will prevent the pitman 489 from reengaging the stud 487 until after the last reciprocation of the pitman has been completed. As a result the mechanism will come to rest without the arm 482 being operated and the amount entered in the change computing mechanism will not be withdrawn. The operator will then depress the same amount tendered key as before, then the number key representing the number of tickets called for of the second class or series and then a price key 30. As a result the price segment 321 will be operated to actuate the change controlling shaft 312 additional extents. After the last of these amounts has been entered and the change ejected, the pitman 489 will be reconnected to the arm 482 so as to set the amount of sale part of the change computing mechanism at zero.

If tickets should be called for and there should be no amount tendered key corresponding to the amount tendered in payment the machine is simply operated by means of the keys 30 and 31 to issue the desired tickets. The change must then be computed mentally, after which the operator can operate one or more of the keys 710 to throw out the computed change.

While the form of mechanism herein shown and described, is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination with devices adjustable to represent amounts tendered, of means for adjusting said devices directly from one position to another without a return movement to a normal starting point, devices operable to accumulate a plurality of amounts to be deducted from the amount tendered, change ejectors, means for operating the ejectors, means controlled jointly by the aforesaid devices for controlling said operating means, and devices for clearing the accumulating devices after operation of said operating means.

2. In a machine of the class described, the combination with devices adjustable to represent amounts tendered, of means for adjusting said devices directly from one position to another without a return movement to a normal starting point, devices operable to accumulate a plurality of amounts to be deducted from the amount tendered, change ejectors, means for operating said ejectors, means controlled jointly by the aforesaid devices for controlling the operating means, devices for clearing the accumulating devices after operation of said operating means, and means for disabling the clearing devices.

3. In a machine of the class described, the combination with devices adjustable to represent amounts tendered, of means for adjusting said devices directly from one position to another without a return movement to a normal starting point, devices operable to accumulate a plurality of amounts the total of which is to be deducted from the amount tendered, change ejectors, means controlled jointly by the aforesaid devices for operating the ejectors, means normally clearing the accumulating devices after the last amount is accumulated, and manually operable devices for disabling the clearing means when additional amounts are to be entered in the accumulating devices before the change is ejected.

4. In a machine of the class described, the combination with change computing mechanism, of change issuing mechanism, means for introducing into the computing mechanism the amount tendered, means for actuating the computing mechanism a plurality of times to introduce items to be deducted from the amount tendered, and means rendered effective when the last item is entered for operating the change issuing mechanism to issue the computed change.

5. In a machine of the class described, the combination with a differentially operable actuator, of means for controlling the extent of operations of the actuator, means for operating the actuator a variable number of times during one complete operation of the machine, change computing mechanism, and devices whereby at each operation of the actuator a corresponding extent of movement will be imparted to the change computing mechanism.

6. In a machine of the class described, the combination with an oscillatory actuator, of means for oscillating said actuator over any desired one of several extents a variable number of times during one complete operation of the machine, change determining devices, and means for imparting movement in one direction to the change determining devices at each oscillation of the actuator.

7. In a machine of the class described, the combination with an oscillatory actuator, of means for oscillating said actuator over any desired one of several extents a variable number of times during one complete operation of the machine, change ejectors, ejector controlling devices comprising an element having a normal starting point, means for imparting movement in one direction to said element at each oscillation of the actuator, and means for setting said element at its starting point after the change has been ejected.

8. In a machine of the class described, the combination with an oscillatory actuator, of means for oscillating said actuator over any desired one of several extents a variable number of times during one complete operation of the machine, change ejectors, ejector controlling devices comprising an element having a normal starting point, means for imparting movement in one direction to said element at each operation of the actuator, and means for moving the element over the shortest distance to set it at its starting point after the change has been ejected.

9. In a machine of the class described, the combination with devices for issuing a varying number of various priced tickets, of means for determining the number of tickets to be issued, change computing mechanism, means for entering therein an amount tendered, and means to reduce said amount tendered by the amount of the sale of tickets, and connections whereby the determining means controls the change computing mechanism.

10. In a machine of the class described, the combination with a ticket issuing mechanism, of means for operating said mechanism to issue a variable number of tickets, change computing mechanism, and connections for introducing into said computing mechanism the total value of the tickets issued at an operation of the ticket issuing mechanism.

11. In a machine of the class described, the combination with a ticket issuing mechanism, of means for operating said mechanism to issue a variable number of tickets, change computing mechanism, and means for accumulating in the computing mechanism the total value of the tickets issued.

12. In a machine of the class described, the combination with a ticket issuing mechanism, of means for operating said mechanism to issue a variable number of tickets, change computing mechanism, and connections actuated as each ticket is issued for introducing the value of the ticket into said computing mechanism.

13. In a machine of the class described, the combination with a ticket issuing mechanism, of means for operating said mechanism to issue a variable number of tickets, change computing mechanism, connections actuated as each ticket is issued for introducing the value of the ticket into said computing mechanism, means for ejecting the computed change, and means for operating the computing mechanism to destroy the computation after the change has been ejected.

14. In a machine of the class described, the combination with a ticket issuing mechanism, of means for operating said mechanism to issue a variable number of tickets, change computing mechanism, connections for introducing into said computing mechanism the total value of the tickets issued at an operation of the ticket issuing mechanism, and means for withdrawing said total value from the computing mechanism after the computation is completed.

15. In a machine of the class described, the combination with a ticket issuing mechanism, of means for operating said mechanism to issue a variable number of tickets, change computing mechanism, connections actuated as each ticket is issued for introducing into said computing mechanism the total value of the tickets issued at an operation, and means for withdrawing said value from the computing mechanism at the end of the operation.

16. In a machine of the class described, the combination with a plurality of ticket issuing mechanisms, of means for operating any desired mechanism to issue a variable number of tickets therefrom, change computing mechanism, and connections for actuating the change computing mechanism to accumulate therein the value of the tickets issued at an operation.

17. In a machine of the class described, the combination with a plurality of ticket issuing mechanisms, of means for operating any desired mechanism to issue a variable number of tickets therefrom, change computing mechanism, change issuing mechanism controlled by the computing mechanism, and connections for accumlating the value of a number of tickets in the computing mechanism to control a subsequent operation of the change issuing mechanism.

18. In a machine of the class described, the combination with a plurality of ticket issuing mechanisms, of means for operating any desired mechanism to issue a variable number of tickets therefrom, change computing mechanism, change issuing mechanism controlled by the computing mechanism, connections whereby as each ticket is issued its price is introduced into the change computing mechanism, and means for operating the change issuing mechanism after the last ticket of the variable number is issued.

19. In a machine of the class described, the combination with a plurality of ticket issuing mechanisms, of means for operating any desired mechanism to issue a variable number of tickets therefrom, change computing mechanism, change issuing mechanism controlled by the computing mechanism, connections whereby as each ticket is issued its price is introduced into the change computing mechanism, and means preventing operation of the change issuing mechanism until the price of the last ticket of the variable number of tickets has been entered in the change computing mechanism.

20. In a machine of the class described, the combination with a plurality of ticket issuing mechanisms, of means for operating any desired one of said mechanisms to issue a variable number of tickets therefrom, manipulative means for selecting the ticket issuing mechanism to be operated and manipulative means for determining the number of tickets to be issued, change computing mechanism, and connections controlled jointly by the two manipulative means for introducing prices into the change computing mechanism.

21. In a machine of the class described, the combination with a plurality of ticket issuing mechanisms, of means for operating any desired one of said mechanisms to issue a variable number of tickets therefrom, a series of keys selectively operable to determine the ticket issuing mechanism to be operated, a series of keys operable to determine the number of tickets to be issued, change computing mechanism, and connections controlled jointly by the two series for introducing prices into the change computing mechanism.

22. In a machine of the class described, the combination with a plurality of ticket issuing mechanisms constructed to issue tickets of different values, of means for operating any desired one of said mechanisms to issue a variable number of tickets therefrom, manipulative devices controlling said means, amount tendered manipulative devices, and change making devices controlled jointly by the manipulative controlling and amount tendered devices.

23. In a machine of the class described, the combination with a plurality of ticket issuing mechanisms each constructed to issue tickets of a value different from the others, of means for operating any desired one of said mechanisms to issue a variable number of tickets therefrom, a series of keys selectively operable to determine the ticket issuing mechanism to be operated, a series of keys operable to determine the number of tickets to be issued, amount tendered keys, and change making devices controlled jointly by the three series of keys.

24. In a machine of the class described, the combination with ticket issuing mechanism constructed to issue tickets of different values and one or more tickets at an operation, of change computing mechanism, connections for introducing the price of each ticket into said computing mechanism as the ticket is issued, and change ejecting mechanism controlled by the change computing mechanism.

25. In a machine of the class described, the combination with ticket issuing mechanism constructed to issue tickets of different prices and one or more tickets at an operation, of change computing mechanism, connections for accumulating in the computing mechanism the price of the tickets issued at an operation, change ejectors, and means controlled by the computing mechanism for operating the change ejectors after the accumulation of the ticket prices is completed.

26. In a machine of the class described, the combination with ticket issuing devices operable to issue a variable number of tickets of any one of several different prices at an operation, of a series of keys selectively operable to determine the number of tickets to be issued, a series of keys selectively operable to determine the price of the tickets, change computing mechanism, connections controlled jointly by the two series of keys for introducing into the computing mechanism the price of the tickets issued at an operation, and manipulatively controlled means for introducing into the change computing mechanism the amount tendered.

27. In a machine of the class described, the combined with ticket issuing devices operable to issue a variable number of tickets of any one of several different prices at an operation, of a series of keys selectively operable to determine the number of tickets to be issued, a series of keys selectively operable to determine the price of the tickets, change computing mechanism, and connections controlled jointly by the two series of keys for introducing amounts into the change computing mechanism.

28. In a machine of the class described, the combination with a variably operable driving mechanism, of manipulative means controlling the extent of the operations of said mechanism, a plurality of ticket issuing mechanisms each constructed to issue tickets of a different price from the others, devices for coupling any desired ticket issuing mechanism to the driving mechanism, manipulative means for controlling said devices, change computing mechanism, and connections controlled jointly by the two manipulative means for introducing into the change computing mechanism the price of the tickets issued at an operation of the driving mechanism.

29. In a machine of the class described, the combination with a variably operable driving shaft, of a plurality of ticket issuing mechanisms each constructed to issue tickets of a different price from the others, means for coupling any desired one of said mechanisms to the variably operable shaft, change ejectors, adjustable devices controlling the change ejectors, and connections for adjusting said devices to different positions depending upon the extent of movement of the driving shaft and the ticket issuing mechanism coupled thereto.

30. In a machine of the class described, the combination with mechanism for issuing one or more tickets at a single operation, of change ejectors, adjustable computing devices controlling operation of the change ejectors, and means for adjusting said controlling devices according to the number of tickets issued.

31. In a machine of the class described, the combination with mechanism for issuing one or more tickets at a single operation, of a set of coin ejectors, adjustable computing devices controlling operation of the coin ejectors, and connections actuated as each ticket of the predetermined number is issued for adjusting the controlling devices.

32. In a machine of the class described, the combination with mechanism for issuing one or more tickets at a single operation, of a set of change ejectors, a differentially movable shaft, devices carried by said shaft for controlling operation of the change ejectors, and connections for imparting an increment of movement in one direction to said shaft as each ticket is issued.

33. In a machine of the class described, the combination with a variably operable driving shaft, of a plurality of ticket issuing mechanisms, means for coupling any desired one of said mechanisms to the variably operable shaft, change ejectors, adjustable devices controlling the change ejectors, and connections for adjusting said controlling devices to different positions depending upon the extent of movement of the driving shaft and the ticket issuing mechanism coupled thereto.

34. In a machine of the class described, the combination with a variably operable driving shaft, of a plurality of ticket issuing mechanisms for issuing tickets of different prices, means for operatively connecting any desired ticket issuing mechanism to the variably operable shaft whereby to cause said connected mechanism to issue one or more tickets depending upon the extent of movement of the shaft, change computing mechanism, and connections for introducing into said computing mechanism the total price of the tickets issued by an operation of the variably operable driving shaft.

35. In a machine of the class described, the combination with a plurality of ticket issuing mechanisms, of means for operating any desired mechanism to issue a variable number of tickets therefrom, change issuing mechanism normally operated at the end of each ticket issuing operation, means whereby a plurality of ticket issuing operations may be required to effect operation of the change issuing mechanism, and manipulative devices controlling the means last mentioned.

36. In a machine of the class described, the combination with devices adjustable to represent amounts tendered, of devices operable to accumulate a plurality of amounts the total of which is to be deducted from the amount tendered, change issuing mechanism controlled jointly by said devices, means normally operating said mechanism to issue the computed change, normally effective means for setting the accumulating devices at zero after a series of amounts has been accumulated, and manipulative means for preventing operation of said setting means and change issuing means when additional amounts are to be entered in the accumulating devices.

37. In a machine of the class described, the combination with devices adjustable to represent amounts tendered, of devices operable to accumulate a series of amounts the total of which is to be deducted from the amount tendered, change ejectors, means controlled jointly by the aforesaid devices normally operating the change ejectors after the accumulation of the series of amounts is completed, means normally clearing the accumulating devices after the accumulation of a series of items is completed, and manipulative means for preventing operation of the clearing means and ejectors when another series of amounts is to be accumulated before ejecting the change.

38. In a machine of the class described, the combination with change computing mechanism, of change issuing mechanism, means for introducing into the computing mechanism the amount tendered, means for actuating the computing mechanism a plurality of times to introduce a series of items the total of which is to be deducted from the amount tendered, means normally rendered effective when the last item is introduced for operating the change mechanism to issue the computed change, and a manipulative device operable to render the last mentioned means ineffective.

39. In a machine of the class described, the combination with change computing mechanism, of change issuing mechanism, means for introducing into the computing mechanism the amount tendered, means for actuating the computing mechanism a plurality of times to introduce a series of items the total of which is to be deducted from the amount tendered, means normally rendered effective when the last item is introduced for operating the change mechanism to issue the computed change, means whereby a plurality of series of items may be introduced before the change issuing mechanism is operated, and manipulative devices controlling the means last mentioned.

40. In a machine of the class described, the combination with a ticket issuing mechanism, of means for operating said mechanism to issue a variable number of tickets at an operation, change computing mechanism, connections actuated as each ticket is issued for introducing the price of the ticket into said computing mechanism, means normally ejecting the computed change at the end of an operation, means normally actuating the computing mechanism at the end of an operation to destroy the computation, and manipulative devices for preventing operation of the two means last mentioned until a second operation of the ticket issuing mechanism is completed.

41. In a machine of the class described, the combination with a plurality of ticket issuing mechanisms, of means for operating any desired mechanism to issue a variable number of tickets therefrom, change computing mechanism, connections for introducing into said computing mechanism the price of each ticket as it is issued, change issuing mechanism, means normally operating the change issuing mechanism at the end of a ticket issuing operation, and manually operable means for preventing operation of the change issuing mechanism until an additional ticket issuing operation is completed.

42. In a machine of the class described, the combination with a driving mechanism, of change computing mechanism, change ejectors, means controlled by the computing mechanism normally operating the change ejectors at each operation of the driving mechanism when the change has been computed, a manipulative device, and means controlled by said manipulative device for preventing operation of the change ejectors at an operation of the driving mechanism, and permitting the introduction of an additional amount in the change computing mechanism.

43. In a machine of the class described, the combination with change issuing mechanism, of change computing mechanism, devices for driving said mechanisms, means controlled by the computing mechanism normally operating the change issuing mechanism at each operation of the driving devices when the change has been computed, a manipulative device, and means controlled by said manipulative device for rendering the operating means ineffective until after certain additional functions have been performed by the computing mechanism.

44. In a machine of the class described, the combination with change issuing devices, of change computing mechanism, means controlled by the change computing mechanism normally operating the change issuing devices when the change has been computed, a manipulating device, and connections whereby operation of the manipulative device will temporarily prevent operation of the change issuing devices.

45. In a machine of the class described, the combination with change issuing devices, of change computing mechanism, means controlled by the computing mechanism normally operating the change issuing devices when the change has been computed, a two price key, and connections whereby operation of the two price key will prevent operation of the change issuing devices.

46. In a machine of the class described, the combination with change issuing devices, of change computing mechanism, means for introducing amounts tendered into the computing mechanism, means for accumulating in the computing mechanism a plurality of equal amounts the total of which is to be deducted from the amount tendered, means controlled by the computing mechanism normally operating the change issuing devices when said accumulation is completed, and manipulative devices for rendering said means ineffective when different amounts are to be included in the total to be deducted from the amount tendered.

47. In a machine of the class described, the combination with change issuing devices, of change computing mechanism, means for introducing amounts tendered into the computing mechanism, means for separately introducing into the computing mechanism a series of amounts the total of which is to be deducted from the amount tendered, means normally operating the change issuing devices to issue the computed change when the last amount of the series is introduced, and manipulative means operable to permit introducing a plurality of series of items before the change issuing devices are operated.

48. In a machine of the class described, the combination with change ejectors, of change computing mechanism, means for introducing amounts tendered into the computing mechanism, means for separately introducing into the computing mechanism a series of items the total of which is to be deducted from the amount tendered, means controlled by the computing mechanism normally operating the change ejectors after the last item of a series is introduced, and means for preventing operation of said means when a second series of items is to be introduced into the computing mechanism before the change is ejected.

49. In a machine of the class described, the combination with change ejectors, of change computing mechanism, means for introducing amounts tendered into the computing mechanism, means for separately introducing into the computing mechanism a series of amounts the total of which is to be deducted from the amount tendered, means controlled by the computing mechanism normally operating the change ejectors after the last item of a series is introduced, and manipulative means for preventing operation of said operating means when additional amounts are to be introduced into the computing mechanism before the change is ejected.

50. In a machine of the class described, the combination with change issuing devices, of change computing mechanism, means for introducing amounts tendered into the computing mechanism, means for successively actuating the computing mechanism to introduce a plurality of amounts the total of which is to be deducted from the amount tendered, means normally operating the change issuing devices to issue the computed change when the last amount of the series has been introduced, and manipulative devices controlling said operating means.

51. In a machine of the class described, the combination with change issuing devices, of change computing mechanism, means for introducing amounts tendered into the computing mechanism, means for separately introducing into the computing mechanism a plurality of equal amounts the total of which is to be deducted from the amount tendered, means normally operating the change issuing devices when the last of said equal amounts is introduced into the computing mechanism, and means for preventing operation of the operating means when a plurality of unequal amounts is to be introduced into the computing mechanism.

52. In a machine of the class described, the combination with change issuing devices, of change computing mechanism, means for introducing amounts tendered into the computing mechanism, means for successively actuating the computing mechanism to introduce a plurality of amounts the total of which is to be deducted from the amount tendered, means normally operating the change issuing devices to issue the computed change when the last amount of the series has been introduced, and manipulative devices operable when desired to render the operating means ineffective.

53. In a machine of the class described, the combination with a set of change ejectors, of rock shaft, devices carried by said shaft constructed to engage and operate the change ejectors, change computing mechanism controlling the engagement of said devices and the change ejectors, a cam and pitman for rocking the shaft in one direction to carry the devices thereon into position to engage the change ejectors, a spring for rocking the shaft in the opposite direction to operate engaged change ejectors, and a dash pot regulating the action of the spring.

54. In a machine of the class described, the combination with change computing mechanism, of change issuing mechanism, means for introducing into the computing mechanism the amount tendered, means for introducing into the computing mechanism a plurality of amounts the total of which is to be deducted from the amount tendered, and means rendered effective when the last amount is entered for operating the change issuing mechanism and actuating the computing mechanism to destroy the computation.

55. In a machine of the class described, the combination with change computing mechanism, of change issuing mechanism, means for introducing into the computing mechanism the amount tendered, means for introducing into the computing mechanism a plurality of amounts the total of which is to be deducted from the amount tendered, means normally rendered effective when the last amount is entered in the computing mechanism for operating the change computing mechanism to destroy the computation, and devices for preventing the means last mentioned from becoming effective when additional amounts are to be accumulated before the change is issued.

56. In a machine of the class described, the combination with change computing mechanism, of change issuing mechanism, means for introducing into the computing mechanism the amount tendered, means for accumulating in the computing mechanism a series of amounts the total of which is to be deducted from the amount tendered, means normally rendered effective when the last amount of a series is accumulated for operating the computing mechanism to destroy the computation, and devices manually operable to prevent the means last mentioned from becoming effective when additional amounts are to be deducted from the amount tendered.

57. In a machine of the class described, the combination with change computing mechanism comprising devices adjustable to different positions according to the change to be issued, of a plurality of change holders, mechanism controlled by the aforesaid devices for ejecting change from the change holders, means whereby said mechanism may be caused to eject change from either of two tubes at a certain position of the adjustable devices, and manually operable devices controlling said means.

58. In a machine of the class described, the combination with change computing mechanism comprising devices adjustable to different positions according to the change to be issued and manipulative devices controlling same, of a plurality of change holders, mechanism controlled by the aforesaid devices for ejecting change from the change holders, means whereby said mechanism may be caused to eject change from either of two tubes at certain positions of the controlling devices, and a manually adjustable lever controlling said means.

59. In a machine of the class described, the combination with a plurality of change ejectors, of means for operating same, manipulative devices, devices adjustable to different positions under the control of the manipulative devices to select different ejectors for operation, said adjustable devices being so constructed as to select two related ejectors for operation when adjusted to a certain position, and manipulative devices operable to determine which of said two ejectors is to be operated.

60. In a machine of the class described, the combination with a plurality of change ejectors, of means for operating same, manipulative devices, devices adjustable to different positions under the control of the manipulative devices whereby to select different ejectors for operation, said adjustable devices being so constructed as to select two of the ejectors for operation when adjusted to a certain position, and a device manually adjustable to determine which of said two ejectors is to be operated.

61. In a machine of the class described, the combination with two coin holders, one containing dimes and the other five cent pieces, of an ejector constructed to eject one dime from the dime tube and an ejector constructed to eject two five cent pieces from the five cent tube, operating devices common to the ejectors, and manipulative means operable to permit operation of either ejector by said operating devices and prevent operation of the other ejector.

62. In a machine of the class described, the combination with a ticket issuing mechanism, of means for operating said mechanism to issue a variable number of tickets of different values, change computing mechanism, and means for accumulating in the computing mechanism the total value of the tickets issued.

63. In a machine of the class described, the combination with a ticket issuing mechanism, of means for operating said mechanism to issue a variable number of tickets of different values, change computing mechanism and connections actuated as each ticket is issued for introducing the value of the ticket in the said computing mechanism.

64. In a machine of the class described, the combination with a ticket issuing mechanism, of means for operating said mechanism to issue a variable number of tickets of different values, change computing mechanism, connections actuated as each ticket is issued for introducing the value of the ticket into said computing mechanism, means for ejecting the computed change, and means for operating the computing mechanism to destroy the computation after the change has been ejected.

65. In a machine of the class described, the combination with a ticket issuing mechanism, of means for operating said mechanism to issue a variable number of tickets of different values, change computing mechanism, connections for introducing into said computing mechanism the total value of the tickets issued at an operation of the ticket issuing mechanism, and means for withdrawing said total value from the computing mechanism after the computation is completed.

66. In a machine of the class described, the combination with a ticket issuing mechanism, of means for operating said mechanism to issue a varibale number of tickets of different values, change computing mechanism, connections actuated as each ticket is issued for introducing into said computing mechanism the total value of the tickets issued at an operation, and means for withdrawing said value from the computing mechanism at the end of the operation.

67. In a machine of the class described, the combination with a plurality of ticket issuing mechanisms, of means for operating any desired mechanism to issue a variable number of tickets therefrom of different values, change computing mechanism, and connections for introducing into said computing mechanism the value of each ticket as it is issued.

68. In a machine of the class described, the combination with a plurality of ticket issuing mechanisms, of means for operating any desired mechanism to issue a variable number of tickets therefrom of different values, change computing mechanism, and connections for actuating the change computing mechanism to accumulate therein the values of the tickets issued at an operation.

69. In a machine of the class described, the combination with a mechanism for issuing one or more tickets at a single operation of different values, of change ejectors, adjustable computing devices controlling operations of the change ejectors, and means for adjusting said controlling devices according to the number of tickets issued.

70. In a machine of the class described, the combination with a mechanism for issuing one or more tickets of different values at a single operation, of a set of coin ejectors, adjustable computing devices controlling operation of the coin ejectors, and connections actuated as each ticket of the predetermined number is issued for adjusting the controlling devices.

71. In a machine of the class described, the combination with a mechanism for issuing one or more tickets at a single operation, of a set of change ejectors, a differentially movable shaft, computing devices carried by said shaft for controlling operation of the change ejectors, and connections for imparting an increment of movement in one direction to said shaft as each ticket is issued.

72. In a machine of the class described, the combination with a mechanism for issuing one or more tickets of different values at a single operation, a set of change ejectors, a differentially movable shaft, computing devices carried by said shaft for controlling operation of the change ejectors, and connections for imparting an increment of movement in one direction to said shaft as each ticket is issued.

73. In a machine of the class described, the combination with a driving mechanism, of change computing mechanism, change ejectors, means controlled by the computing mechanism normally operating the change ejectors at each operation of the driving mechanism irrespective of the relative amount of the purchase and tendered sum, a manipulative device, and means controlled by said manipulative device for preventing operation of the change ejectors at an operation of the driving mechanism so as to admit of the further introduction of an amount in the computor so that the change ejectors shall issue change in connection with the additional part of the transaction.

74. In a machine of the class described, the combination with a change issuing mechanism, of change computing mechanism, devices for driving said mechanism, means controlled by the computing mechanism normally operating the change issuing mechanism at each operation of the driving device irrespective of the relative amount of the purchase and tendered sum, a manipulative device, and means controlled by the said manipulative device for rendering the operating means ineffective until the various parts of a transaction have been entered in said computor and change ejected for the entire transaction.

75. In a machine of the class described, the combination with change issuing devices, of change computing devices, means controlled by the change computing mechanism normally operating the change issuing device when the change has been computed irrespective of the relative amount of the purchase and tendered sum, a manipulative device, and connections whereby operation of the manipulative device will prevent operation of the change issuing devices until the various parts of a transaction have been entered in said computor and change ejected for the entire transaction.

76. In a machine of the class described, the combination with means for adjusting the parts thereof in representation of a certain sum of money, of means to vary said representation by the combined action of a multiplicity of members one of which represents price and another numbers, said multiplicity of members being substantially simultaneously actuated as distinguished from a succession of movements repeating prior actuations.

77. In a machine of the class described, means to set up therein an amount tendered, means to enter therein, substantially instantaneously, an amount consisting of the price multiplied by the number of several articles of the same kind, and thereafter to enter substantially simultaneously other amounts comprising the product of prices of other articles in desired quantities.

78. In a machine of the class described in combination, key members of which one represents an amount of money, means to enter the same in said machine, means to subtract therefrom an amount equal to the product of the number represented upon another key number multiplied by a price upon another key member and coin ejector means controlled by the foregoing means and issuing change coinciding in amount with the remainder of the amount tendered.

79. A computor, means to represent therein an amount tendered, means to represent therein the price of a unit of an article and means to indicate the number of units of an article dealt with therein, a change ejecting mechanism and means controlling the same causing change issuance according to the difference between the amount tendered and the product of the number of units and price of a unit of an article.

80. A change computor, means to represent therein an amount tendered comprising an actuator spacing the parts therein so that the final position shall vary from the starting position an extent representing said amount tendered, means to represent therein the price of a unit of an article including an indicator of the particular price and connecting members between the same and the computor, and means to indicate the number of units of an article therein comprising a member displaced in accordance with the number of units, and change issuing means comprising an ejector the actuation of which is under the control of said computor and ejecting change equal to the difference between the amount tendered and the product of the number of units and price of a unit of an article.

In testimony whereof I affix my signature.

EDWARD J. VON PEIN.